(12) United States Patent
Li et al.

(10) Patent No.: US 11,212,034 B2
(45) Date of Patent: Dec. 28, 2021

(54) TECHNIQUES FOR SIGNALING QOS CLASS INDICATORS

(71) Applicant: QUALCOMM Incorporated, San Diego, CA (US)

(72) Inventors: Chih-Ping Li, San Diego, CA (US); Wanshi Chen, San Diego, CA (US); Jing Jiang, San Diego, CA (US); Peter Gaal, San Diego, CA (US); Seyedkianoush Hosseini, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 16/351,184

(22) Filed: Mar. 12, 2019

(65) Prior Publication Data
US 2019/0288789 A1 Sep. 19, 2019

Related U.S. Application Data

(60) Provisional application No. 62/642,942, filed on Mar. 14, 2018.

(51) Int. Cl.
*H04L 1/00* (2006.01)
*H04W 28/02* (2009.01)
(Continued)

(52) U.S. Cl.
CPC .......... *H04L 1/0025* (2013.01); *H04L 1/0003* (2013.01); *H04L 1/0026* (2013.01);
(Continued)

(58) Field of Classification Search
CPC .......... H04L 1/00; H04L 47/00; H04W 28/00; H04W 72/00
See application file for complete search history.

(56) References Cited

U.S. PATENT DOCUMENTS

2015/0296490 A1\* 10/2015 Yi ........................ H04W 52/281
370/329
2018/0084021 A1\* 3/2018 Rubin .................. H04W 36/02
(Continued)

FOREIGN PATENT DOCUMENTS

EP 3273634 A1 1/2018
WO WO-2017172789 A1 10/2017

OTHER PUBLICATIONS

CATT: "Necessity of a Compact DCI Format for NR URLLC," 3GPP Draft; R1-1801749, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397730, 3 Pages, Retrieved from the Internet: URL: http://www.3gpp.org/ftp/tsg%5Fran/WG1%5FRL1/TSGR1%5F92/Docs/ [retrieved on Feb. 17, 2018] the whole document.
(Continued)

*Primary Examiner* — Jung H Park
*Assistant Examiner* — Sumitra Ganguly

(57) ABSTRACT

Techniques are described herein related to communicating a quality of service (QoS) class identifier (QCI) for configuring physical (PHY) layer signaling. The QCI may be used to configure one or more transmission parameters of a device (e.g., a user equipment (UE) or a base station) at a PHY layer. The PHY layer may select the one or more transmission parameters to meet the QoS conditions of a given QoS class of a transport block being communicated. A modulation and coding scheme (MCS) value may be used as the QCI for the PHY layer, a channel quality indicator (CQI) value may be used as the QCI for the PHY layer, or a cell radio network temporary identifier (C-RNTI) may be used as the QCI for the PHY layer. In some cases, the QCI may be a single bit included in a downlink control message.

26 Claims, 19 Drawing Sheets

(51) Int. Cl.
  *H04W 72/04*   (2009.01)
  *H04L 5/00*    (2006.01)
  *H04L 12/801*  (2013.01)
  *H04W 28/24*   (2009.01)
  *H04L 1/18*    (2006.01)

(52) U.S. Cl.
  CPC ............ *H04L 5/0053* (2013.01); *H04L 47/14* (2013.01); *H04W 28/0268* (2013.01); *H04W 28/24* (2013.01); *H04W 72/04* (2013.01); *H04W 72/0406* (2013.01); *H04L 1/1812* (2013.01); *H04L 5/0048* (2013.01)

(56) References Cited

U.S. PATENT DOCUMENTS

| | | | | |
|---|---|---|---|---|
| 2018/0324835 A1* | 11/2018 | Agiwal | ............. | H04W 72/0453 |
| 2018/0375635 A1* | 12/2018 | Terry | .................... | H04L 5/0057 |
| 2019/0053081 A1* | 2/2019 | Bagheri | ................ | H04W 24/08 |
| 2019/0215095 A1* | 7/2019 | Park | ..................... | H04W 72/042 |
| 2019/0215725 A1* | 7/2019 | Kim | ..................... | H04W 28/065 |
| 2019/0254088 A1* | 8/2019 | Park | ....................... | H04L 1/1854 |
| 2019/0281523 A1* | 9/2019 | Lee | ....................... | H04W 36/30 |

OTHER PUBLICATIONS

International Search Report and Written Opinion—PCT/US2019/022018—ISA/EPO—dated May 24, 2019.
Panasonic: "Discussion on Structure of Group Common PDCCH," 3GPP Draft; R1-1713877, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017, XP051316670, 2 Pages, Retrieved from the Internet: URL: http://www.3gpp.org/ftp/Meetings_3GPP_SYNC/RAN1/Docs/ [retrieved on Aug. 20, 2017] the whole document.
Samsung: "On Need for Additional DCI Format," 3GPP Draft; R1-1802000—On Need for Additional DCI Format, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 16, 2018, XP051397109, 4 pages, Retrieved from the Internet: URL: http://www.3gpp.org/ftp/tsg%5Fran/WG1%5FRL1/TSGR1%5F92/Docs/ [retrieved on Feb. 16, 2018] the whole document.

* cited by examiner

TECHNIQUES FOR SIGNALING QOS CLASS INDICATORS

CROSS REFERENCE

The present Application for Patent claims the benefit of U.S. Provisional Patent Application No. 62/642,942 by Li, et al., entitled "TECHNIQUES FOR SIGNALING QOS CLASS INDICATORS," filed Mar. 14, 2018, assigned to the assignee hereof, and expressly incorporated by reference herein in its entirety.

BACKGROUND

The following relates generally to wireless communication, and more specifically to techniques for signaling quality of service (QoS) class indicators.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems support transmitting packets with different QoS requirements. The QoS classes or QoS requirements may be handled, in some cases, at layers higher than a physical (PHY) layer.

SUMMARY

The described techniques relate to improved methods, systems, devices, or apparatuses that support techniques for signaling quality of service (QoS) class indicators. Generally, the described techniques relate to communicating a QoS class identifier (QCI) for configuring physical (PHY) layer signaling. The QCI may be used to configure one or more transmission parameters of a device (e.g., a base station or a user equipment (UE)) at a PHY layer. The PHY layer may select the one or more transmission parameters to meet the QoS conditions of a given QoS class of a transport block being communicated. A modulation and coding scheme (MCS) value may, in some cases, be used as the QCI for the PHY layer, a channel quality indicator (CQI) value may be used as the QCI for the PHY layer, or a cell radio network temporary identifier (C-RNTI) may be used as the QCI for the PHY layer. In some cases, the QCI may be a single bit included in a downlink control message.

A method of wireless communication is described. The method may include receiving, by a UE, a message that includes a transmission parameter for the UE, determining a QoS class of a transport block based on the transmission parameter included in the message, and communicating, with a base station, the transport block using the transmission parameter for a PHY layer of the transport block based on determining the QoS class.

An apparatus for wireless communication is described. The apparatus may include means for receiving, by a UE, a message that includes a transmission parameter for the UE, means for determining a QoS class of a transport block based on the transmission parameter included in the message, and means for communicating, with a base station, the transport block using the transmission parameter for a PHY layer of the transport block based on determining the QoS class.

Another apparatus for wireless communication is described. The apparatus may include a processor, memory in electronic communication with the processor, and instructions stored in the memory. The instructions may be operable to cause the processor to receive, by a UE, a message that includes a transmission parameter for the UE, determine a QoS class of a transport block based on the transmission parameter included in the message, and communicate, with a base station, the transport block using the transmission parameter for a PHY layer of the transport block based on determining the QoS class.

A non-transitory computer-readable medium for wireless communication is described. The non-transitory computer-readable medium may include instructions operable to cause a processor to receive, by a UE, a message that includes a transmission parameter for the UE, determine a QoS class of a transport block based on the transmission parameter included in the message, and communicate, with a base station, the transport block using the transmission parameter for a PHY layer of the transport block based on determining the QoS class.

Some examples of the method, apparatus, and non-transitory computer-readable medium described above may further include processes, features, means, or instructions for determining the transmission parameter for the PHY layer of the transport block based on determining the QoS class, where communicating the transport block may be based on determining the transmission parameter.

Some examples of the method, apparatus, and non-transitory computer-readable medium described above may further include processes, features, means, or instructions for identifying, in the message, an indicator of the QoS class associated with the transmission parameter, where determining the QoS class may be based on identifying the indicator.

In some examples of the method, apparatus, and non-transitory computer-readable medium described above, identifying the indicator may include identifying a single bit that indicates an enhanced mobile broadband (eMBB) QoS class or an ultra-reliable low-latency communications (URLLC) QoS class.

In some examples of the method, apparatus, and non-transitory computer-readable medium described above, identifying the indicator may include identifying the indicator in a field of downlink control information (DCI) in the message.

Some examples of the method, apparatus, and non-transitory computer-readable medium described above may further include processes, features, means, or instructions for determining the QoS class based on the transmission parameter, where determining the transmission parameter may be based on determining the QoS class.

Some examples of the method, apparatus, and non-transitory computer-readable medium described above may further include processes, features, means, or instructions for configuring the UE to use a plurality of QoS classes, at least one of which may include the determined QoS class, where receiving the message may be based on configuring the UE to use the plurality of QoS classes. In some examples of the method, apparatus, and non-transitory computer-readable medium described above, the transmission parameter may be configured as a QCI for PHY layer signaling.

In some examples of the method, apparatus, and non-transitory computer-readable medium described above, the transmission parameter may be an MCS value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for channel state information (CSI) reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of a sounding reference signal (SRS), a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a hybrid automatic repeat request acknowledgement (HARQ-ACK), or a combination thereof.

Some examples of the method, apparatus, and non-transitory computer-readable medium described above may further include processes, features, means, or instructions for receiving a second message that includes a second transmission parameter associated with a second QoS class different from the QoS class. Some examples of the method, apparatus, and non-transitory computer-readable medium described above may further include processes, features, means, or instructions for determining that both the message and the second message allocate resources for a single communication resource. Some examples of the method, apparatus, and non-transitory computer-readable medium described above may further include processes, features, means, or instructions for selecting the QoS class or the second QoS class to communicate with during the single communication resource based on a conflict resolution procedure.

In some examples of the method, apparatus, and non-transitory computer-readable medium described above, the QoS class may be an eMBB QoS class or a URLLC QoS class.

In some examples of the method, apparatus, and non-transitory computer-readable medium described above, the message may be an uplink control/resource allocation message or a downlink control/resource allocation message communicated using a physical downlink control channel (PDCCH).

A method of wireless communication is described. The method may include receiving a message that includes a C-RNTI for a UE, determining a QoS class associated with the C-RNTI from a plurality of QoS classes based on receiving the message, and communicating, with a base station, a transport block using a transmission parameter for a PHY layer based on determining the QoS class associated with the C-RNTI.

An apparatus for wireless communication is described. The apparatus may include means for receiving a message that includes a C-RNTI for a UE, means for determining a QoS class associated with the C-RNTI from a plurality of QoS classes based on receiving the message, and means for communicating, with a base station, a transport block using a transmission parameter for a PHY layer based on determining the QoS class associated with the C-RNTI.

Another apparatus for wireless communication is described. The apparatus may include a processor, memory in electronic communication with the processor, and instructions stored in the memory. The instructions may be operable to cause the processor to receive a message that includes a C-RNTI for a UE, determine a QoS class associated with the C-RNTI from a plurality of QoS classes based on receiving the message, and communicate, with a base station, a transport block using a transmission parameter for a PHY layer based on determining the QoS class associated with the C-RNTI.

A non-transitory computer-readable medium for wireless communication is described. The non-transitory computer-readable medium may include instructions operable to cause a processor to receive a message that includes a C-RNTI for a UE, determine a QoS class associated with the C-RNTI from a plurality of QoS classes based on receiving the message, and communicate, with a base station, a transport block using a transmission parameter for a PHY layer based on determining the QoS class associated with the C-RNTI.

Some examples of the method, apparatus, and non-transitory computer-readable medium described above may further include processes, features, means, or instructions for determining the transmission parameter for the PHY layer of the transport block based on determining the QoS class associated with the C-RNTI, where communicating the transport block may be based on determining the transmission parameter.

Some examples of the method, apparatus, and non-transitory computer-readable medium described above may further include processes, features, means, or instructions for configuring the UE with the plurality of C-RNTIs at least one of which includes the C-RNTI, where each C-RNTI of the plurality of C-RNTIs being associated with a different QoS class.

In some examples of the method, apparatus, and non-transitory computer-readable medium described above, the C-RNTI indicates an eMBB QoS class or a URLLC QoS class.

Some examples of the method, apparatus, and non-transitory computer-readable medium described above may further include processes, features, means, or instructions for configuring the UE to use a plurality of QoS classes, the determined QoS class being one of the plurality of configured QoS classes, where receiving the message may be based on configuring the UE to use the plurality of QoS classes. In some examples of the method, apparatus, and non-transitory computer-readable medium described above, the C-RNTI may be configured as a QCI for PHY layer signaling.

In some examples of the method, apparatus, and non-transitory computer-readable medium described above, the transmission parameter may be an MCS table, a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

Some examples of the method, apparatus, and non-transitory computer-readable medium described above may further include processes, features, means, or instructions for receiving a second message that includes a second C-RNTI associated with second QoS class different from the QoS class. Some examples of the method, apparatus, and non-transitory computer-readable medium described above may further include processes, features, means, or instructions for determining that both the message and the second message allocate resources for a single communication resource. Some examples of the method, apparatus, and non-transitory computer-readable medium described above may further include processes, features, means, or instructions for selecting the QoS class or the second QoS class to communicate with during the single communication resource based on a conflict resolution procedure.

In some examples of the method, apparatus, and non-transitory computer-readable medium described above, the message may be an uplink control/resource allocation message or a downlink control/resource allocation message communicated using a PDCCH.

A method of wireless communication is described. The method may include determining a QoS class of a transport block, transmitting a message that includes a transmission parameter for a UE that indicates the QoS based on determining the QoS class, and communicating, with the UE, the transport block using the transmission parameter for a PHY layer, the transmission parameter being associated with the QoS class of the transport block.

An apparatus for wireless communication is described. The apparatus may include means for determining a QoS class of a transport block, means for transmitting a message that includes a transmission parameter for a UE that indicates the QoS based on determining the QoS class, and means for communicating, with the UE, the transport block using the transmission parameter for a PHY layer, the transmission parameter being associated with the QoS class of the transport block.

Another apparatus for wireless communication is described. The apparatus may include a processor, memory in electronic communication with the processor, and instructions stored in the memory. The instructions may be operable to cause the processor to determine a QoS class of a transport block, transmit a message that includes a transmission parameter for a UE that indicates the QoS based on determining the QoS class, and communicate, with the UE, the transport block using the transmission parameter for a PHY layer, the transmission parameter being associated with the QoS class of the transport block.

A non-transitory computer-readable medium for wireless communication is described. The non-transitory computer-readable medium may include instructions operable to cause a processor to determine a QoS class of a transport block, transmit a message that includes a transmission parameter for a UE that indicates the QoS based on determining the QoS class, and communicate, with the UE, the transport block using the transmission parameter for a PHY layer, the transmission parameter being associated with the QoS class of the transport block.

Some examples of the method, apparatus, and non-transitory computer-readable medium described above may further include processes, features, means, or instructions for determining the transmission parameter for the PHY layer of the transport block based on transmitting the message, where communicating the transport block may be based on determining the transmission parameter.

Some examples of the method, apparatus, and non-transitory computer-readable medium described above may further include processes, features, means, or instructions for generating an indicator included to include in the message that indicates the QoS class associated with the transmission parameter, where transmitting the message may be based on generating the indicator.

In some examples of the method, apparatus, and non-transitory computer-readable medium described above, generating the indicator may further include generating a single bit that indicates an eMBB QoS class or a URLLC QoS class.

In some examples of the method, apparatus, and non-transitory computer-readable medium described above, generating the indicator may further include generating the indicator in a field of DCI in the message.

In some examples of the method, apparatus, and non-transitory computer-readable medium described above, the transmission parameter may be configured as a QCI for PHY layer signaling.

In some examples of the method, apparatus, and non-transitory computer-readable medium described above, the transmission parameter may be an MCS value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

In some examples of the method, apparatus, and non-transitory computer-readable medium described above, the QoS class may be an eMBB QoS class or a URLLC QoS class.

In some examples of the method, apparatus, and non-transitory computer-readable medium described above, the message may be an uplink control/resource allocation message or a downlink control/resource allocation message communicated using a PDCCH.

A method of wireless communication is described. The method may include determining a QoS class of a transport block, transmitting a message that includes a C-RNTI for a UE based on determining the QoS class, and communicating, with the UE, the transport block using a transmission parameter for a PHY layer, the transmission parameter being associated with the QoS class of the transport block.

An apparatus for wireless communication is described. The apparatus may include means for determining a QoS class of a transport block, means for transmitting a message that includes a C-RNTI for a UE based on determining the QoS class, and means for communicating, with the UE, the transport block using a transmission parameter for a PHY layer, the transmission parameter being associated with the QoS class of the transport block.

Another apparatus for wireless communication is described. The apparatus may include a processor, memory in electronic communication with the processor, and instructions stored in the memory. The instructions may be operable to cause the processor to determine a QoS class of a transport block, transmit a message that includes a C-RNTI for a UE based on determining the QoS class, and communicate, with the UE, the transport block using a transmission parameter for a PHY layer, the transmission parameter being associated with the QoS class of the transport block.

A non-transitory computer-readable medium for wireless communication is described. The non-transitory computer-readable medium may include instructions operable to cause a processor to determine a QoS class of a transport block, transmit a message that includes a C-RNTI for a UE based on determining the QoS class, and communicate, with the UE, the transport block using a transmission parameter for a PHY layer, the transmission parameter being associated with the QoS class of the transport block.

Some examples of the method, apparatus, and non-transitory computer-readable medium described above may further include processes, features, means, or instructions for determining the transmission parameter for the PHY layer of the transport block based on transmitting the message, where communicating the transport block may be based on determining the transmission parameter.

Some examples of the method, apparatus, and non-transitory computer-readable medium described above may further include processes, features, means, or instructions for configuring the UE with the plurality of C-RNTIs at least one of which includes the C-RNTI, each C-RNTI of the plurality of C-RNTIs being associated with a different QoS class.

In some examples of the method, apparatus, and non-transitory computer-readable medium described above, the C-RNTI indicates an eMBB QoS class or a URLLC QoS class.

In some examples of the method, apparatus, and non-transitory computer-readable medium described above, the C-RNTI may be configured as a QCI for PHY layer signaling.

In some examples of the method, apparatus, and non-transitory computer-readable medium described above, the transmission parameter may be an MCS table, a CQI table, a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

In some examples of the method, apparatus, and non-transitory computer-readable medium described above, the message may be an uplink control/resource allocation message or a downlink control/resource allocation message communicated using a PDCCH.

A method of wireless communication is described. The method may include receiving, by a UE, a message that includes DCI for the UE, identifying a size of a payload of the DCI based on receiving the message, determining a QoS class of a transport block based on identifying the size of the payload of the DCI, and communicating, with a base station, the transport block using a transmission parameter for a PHY layer of the transport block based on determining the QoS class.

An apparatus for wireless communication is described. The apparatus may include means for receiving, by a UE, a message that includes DCI for the UE, means for identifying a size of a payload of the DCI based on receiving the message, means for determining a QoS class of a transport block based on identifying the size of the payload of the DCI, and means for communicating, with a base station, the transport block using a transmission parameter for a PHY layer of the transport block based on determining the QoS class.

Another apparatus for wireless communication is described. The apparatus may include a processor, memory in electronic communication with the processor, and instructions stored in the memory. The instructions may be operable to cause the processor to receive, by a UE, a message that includes DCI for the UE, identify a size of a payload of the DCI based on receiving the message, determine a QoS class of a transport block based on identifying the size of the payload of the DCI, and communicate, with a base station, the transport block using a transmission parameter for a PHY layer of the transport block based on determining the QoS class.

A non-transitory computer-readable medium for wireless communication is described. The non-transitory computer-readable medium may include instructions operable to cause a processor to receive, by a UE, a message that includes DCI for the UE, identify a size of a payload of the DCI based on receiving the message, determine a QoS class of a transport block based on identifying the size of the payload of the DCI, and communicate, with a base station, the transport block using a transmission parameter for a PHY layer of the transport block based on determining the QoS class.

Some examples of the method, apparatus, and non-transitory computer-readable medium described above may further include processes, features, means, or instructions for decoding, by the UE, the message using at least one of a first DCI size associated with a first QoS class or a second DCI size associated with a second QoS class, where determining the QoS class may be based on whether the decoding was successful with the first DCI size or the second DCI size.

In some examples of the method, apparatus, and non-transitory computer-readable medium described above, a first size of the payload of the DCI for an eMBB QoS class may be different than a second size of the payload of the DCI for a URLLC QoS class.

Some examples of the method, apparatus, and non-transitory computer-readable medium described above may further include processes, features, means, or instructions for determining the transmission parameter for the PHY layer of the transport block based on determining the QoS class, where communicating the transport block may be based on determining the transmission parameter.

In some examples of the method, apparatus, and non-transitory computer-readable medium described above, the size of the payload of the DCI indicates an eMBB QoS class or a URLLC QoS class.

Some examples of the method, apparatus, and non-transitory computer-readable medium described above may further include processes, features, means, or instructions for configuring the UE to use a plurality of QoS classes, the determined QoS class being one of the plurality of configured QoS classes, where receiving the message may be based on configuring the UE to use the plurality of QoS classes.

In some examples of the method, apparatus, and non-transitory computer-readable medium described above, the DCI may be configured as a QCI for PHY layer signaling.

In some examples of the method, apparatus, and non-transitory computer-readable medium described above, the transmission parameter may be an MCS table, a CQI table, a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

Some examples of the method, apparatus, and non-transitory computer-readable medium described above may further include processes, features, means, or instructions for receiving a second message that includes a second DCI associated with second QoS class different from the QoS class. Some examples of the method, apparatus, and non-transitory computer-readable medium described above may further include processes, features, means, or instructions for determining that both the message and the second message allocate resources for a single communication resource. Some examples of the method, apparatus, and non-transitory computer-readable medium described above may further include processes, features, means, or instructions for selecting the QoS class or the second QoS class to communicate with during the single communication resource based on a conflict resolution procedure.

In some examples of the method, apparatus, and non-transitory computer-readable medium described above, the message may be an uplink control/resource allocation message or a downlink control/resource allocation message communicated using a PDCCH.

A method of wireless communication is described. The method may include determining a QoS class of a transport block, transmitting a message that includes DCI for a UE, the DCI having a size of a payload that indicates the QoS based on determining the QoS class, and communicating, with the UE, the transport block using a transmission parameter for a PHY layer, the transmission parameter being associated with the QoS class of the transport block.

An apparatus for wireless communication is described. The apparatus may include means for determining a QoS class of a transport block, means for transmitting a message that includes DCI for a UE, the DCI having a size of a payload that indicates the QoS based on determining the QoS class, and means for communicating, with the UE, the transport block using a transmission parameter for a PHY layer, the transmission parameter being associated with the QoS class of the transport block.

Another apparatus for wireless communication is described. The apparatus may include a processor, memory in electronic communication with the processor, and instructions stored in the memory. The instructions may be operable to cause the processor to determine a QoS class of a transport block, transmit a message that includes DCI for a UE, the DCI having a size of a payload that indicates the QoS based on determining the QoS class, and communicate, with the UE, the transport block using a transmission parameter for a PHY layer, the transmission parameter being associated with the QoS class of the transport block.

A non-transitory computer-readable medium for wireless communication is described. The non-transitory computer-readable medium may include instructions operable to cause a processor to determine a QoS class of a transport block, transmit a message that includes DCI for a UE, the DCI having a size of a payload that indicates the QoS based on determining the QoS class, and communicate, with the UE, the transport block using a transmission parameter for a PHY layer, the transmission parameter being associated with the QoS class of the transport block.

Some examples of the method, apparatus, and non-transitory computer-readable medium described above may further include processes, features, means, or instructions for identifying, by the UE, the size of the payload of the DCI based on determining the QoS class, where transmitting the message may be based on identifying the size of the payload.

In some examples of the method, apparatus, and non-transitory computer-readable medium described above, a first size of the payload of the DCI for an eMBB QoS class may be different than a second size of the payload of the DCI for a URLLC QoS class.

Some examples of the method, apparatus, and non-transitory computer-readable medium described above may further include processes, features, means, or instructions for determining the transmission parameter for the PHY layer of the transport block based on transmitting the message, where communicating the transport block may be based on determining the transmission parameter.

In some examples of the method, apparatus, and non-transitory computer-readable medium described above, the size of the payload of the DCI indicates an eMBB QoS class or a URLLC QoS class.

In some examples of the method, apparatus, and non-transitory computer-readable medium described above, the C-RNTI may be configured as a QCI for PHY layer signaling.

In some examples of the method, apparatus, and non-transitory computer-readable medium described above, the transmission parameter may be an MCS table, a CQI table, a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

In some examples of the method, apparatus, and non-transitory computer-readable medium described above, the message may be an uplink control/resource allocation message or a downlink control/resource allocation message communicated using a PDCCH.

A method of wireless communication is described. The method may include determining, by a UE, a transmission parameter for the UE, determining a QoS class of a transport block based on the transmission parameter, and communicating, with a base station, the transport block using the transmission parameter for a PHY layer of the transport block based on determining the QoS class.

An apparatus for wireless communication is described. The apparatus may include a processor, memory in electronic communication with the processor, and instructions stored in the memory. The instructions may be executable by the processor to cause the apparatus to determine, by a UE, a transmission parameter for the UE, determine a QoS class of a transport block based on the transmission parameter, and communicate, with a base station, the transport block using the transmission parameter for a PHY layer of the transport block based on determining the QoS class.

Another apparatus for wireless communication is described. The apparatus may include means for determining, by a UE, a transmission parameter for the UE, determining a QoS class of a transport block based on the transmission parameter, and communicating, with a base station, the transport block using the transmission parameter for a PHY layer of the transport block based on determining the QoS class.

A non-transitory computer-readable medium storing code for wireless communication is described. The code may include instructions executable by a processor to determine, by a UE, a transmission parameter for the UE, determine a QoS class of a transport block based on the transmission parameter, and communicate, with a base station, the transport block using the transmission parameter for a PHY layer of the transport block based on determining the QoS class.

In some examples of the method, apparatus, and non-transitory computer-readable medium described herein, determining the transmission parameter for the UE may be based on a grant-free configuration of the UE. Some examples of the method, apparatuses, and non-transitory computer-readable medium described herein may further include operations, features, means, or instructions for determining the transmission parameter for the PHY layer of the transport block based on determining the QoS class, where communicating the transport block may be based on determining the transmission parameter. Some examples of the method, apparatuses, and non-transitory computer-readable medium described herein may further include operations, features, means, or instructions for identifying an indicator of the QoS class associated with the transmission parameter, where determining the QoS class may be based on identifying the indicator.

Some examples of the method, apparatuses, and non-transitory computer-readable medium described herein may further include operations, features, means, or instructions for configuring the UE to use a set of QoS classes, at least one of which includes the determined QoS class, where determining the transmission parameter may be based on configuring the UE to use the set of QoS classes. In some examples of the method, apparatuses, and non-transitory computer-readable medium described herein, the transmission parameter may be configured as a QCI for PHY layer signaling.

In some examples of the method, apparatuses, and non-transitory computer-readable medium described herein, the transmission parameter may be an MCS value, a CQI value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

A method of wireless communication is described. The method may include identifying a C-RNTI for a UE, determining a QoS class associated with the C-RNTI from a set of QoS classes based on identifying the C-RNTI, and communicating, with a base station, a transport block using a transmission parameter for a PHY layer based on determining the QoS class associated with the C-RNTI.

An apparatus for wireless communication is described. The apparatus may include a processor, memory in electronic communication with the processor, and instructions stored in the memory. The instructions may be executable by the processor to cause the apparatus to identify a C-RNTI for a UE, determine a QoS class associated with the C-RNTI from a set of QoS classes based on identifying the C-RNTI, and communicate, with a base station, a transport block using a transmission parameter for a PHY layer based on determining the QoS class associated with the C-RNTI.

Another apparatus for wireless communication is described. The apparatus may include means for identifying a C-RNTI for a UE, determining a QoS class associated with the C-RNTI from a set of QoS classes based on identifying the C-RNTI, and communicating, with a base station, a transport block using a transmission parameter for a PHY layer based on determining the QoS class associated with the C-RNTI.

A non-transitory computer-readable medium storing code for wireless communication is described. The code may include instructions executable by a processor to identify a C-RNTI for a UE, determine a QoS class associated with the C-RNTI from a set of QoS classes based on identifying the C-RNTI, and communicate, with a base station, a transport block using a transmission parameter for a PHY layer based on determining the QoS class associated with the C-RNTI.

In some examples of the method, apparatuses, and non-transitory computer-readable medium described herein, identifying the C-RNTI for the UE may include identifying a grant-free configuration of the UE. Some examples of the method, apparatuses, and non-transitory computer-readable medium described herein may further include operations, features, means, or instructions for determining the transmission parameter for the PHY layer of the transport block based on determining the QoS associated with the C-RNTI and the grant-free configuration, where communicating the transport block may be based on determining the transmission parameter.

Some examples of the method, apparatuses, and non-transitory computer-readable medium described herein may further include operations, features, means, or instructions for configuring the UE with a set of C-RNTIs and a set of grant-free configurations, at least one of which includes the identified C-RNTI and the identified grant-free configuration, where each C-RNTI of the set of C-RNTIs and one or a subset of grant-free configurations of the set of grant-free configurations may be associated with a different QoS class. In some examples of the method, apparatuses, and non-transitory computer-readable medium described herein, the C-RNTI and a subset of grant-free configurations may indicate an eMBB QoS class or a URLLC QoS class.

Some examples of the method, apparatuses, and non-transitory computer-readable medium described herein may further include operations, features, means, or instructions for configuring the UE to use the set of QoS classes, the determined QoS class being one of the set of configured QoS classes, where identifying the C-RNTI may be based on configuring the UE to use the set of QoS classes. In some examples of the method, apparatuses, and non-transitory computer-readable medium described herein, the C-RNTI may be configured as a QCI for PHY layer signaling.

In some examples of the method, apparatuses, and non-transitory computer-readable medium described herein, the transmission parameter may be an MCS table, a CQI table, a type of resource allocation on either downlink or uplink, a granularity of resource allocation on either downlink or uplink, a power loop control, power boost, control monitoring, a time-domain configuration for control monitoring, a time-domain resource configuration for data transmissions on either downlink or uplink, a frequency-domain resource configuration for data transmissions on either downlink or uplink, a frequency-hopping pattern and offset for data transmissions on either downlink or uplink, a DMRS configuration on either downlink or uplink, a DMRS sequence initialization on either downlink or uplink, a precoding and number of layers for data transmission on either downlink or uplink, a repetition number and pattern for data transmission on either downlink or uplink, a redundancy-version cycling for repeated data transmissions on either downlink or uplink, a periodicity of grant-free transmissions on either downlink or uplink, a pathloss reference index for either downlink or uplink, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

DETAILED DESCRIPTION

In some wireless communications systems, the physical (PHY) layer of the wireless communications system device may not be informed regarding the quality of service (QoS) requirements or QoS classes for various traffic. In these wireless communications systems, higher layers (e.g., medium access control (MAC) layer and/or those above) may manage QoS classes and the PHY layer may be configured to communicate information efficiently and quickly.

It may be beneficial to signal QoS information related to traffic (e.g., of a transport block) at the PHY layer so that the proper configurations and procedures can be applied to the PHY layer when communicating the traffic. In some wireless communications systems, the PHY layer transmission schemes and/or transmission procedures may depend on the QoS conditions/classes of the underlying traffic.

Techniques are described herein for communicating at least one QoS class identifier (QCI) for configuring PHY layer signaling. The QCI may be used to configure one or more transmission parameters of a device (e.g., a base station or a UE) at a PHY layer. The PHY layer may select the one or more transmission parameters to meet the QoS conditions or requirements of a given QoS class of a transport block being communicated. A modulation and coding scheme (MCS) value may be used as the QCI for the PHY layer, a channel quality indicator (CQI) value may be used as the QCI for the PHY layer, or a cell radio network temporary identifier (C-RNTI) may be used as the QCI for the PHY layer, the payload size of a message, such as a downlink control message, may be used as the QCI for the PHY layer, among other examples. In some cases, the QCI may be a single bit included in a message, such as a downlink control message.

Aspects of the disclosure are initially described in the context of a wireless communications system. Aspects of the disclosure are described in the context of a wireless communications system and a communication scheme. Aspects of the disclosure are further illustrated by and described with reference to apparatus diagrams, system diagrams, and flowcharts that relate to techniques for signaling QoS class indicators.

Figure 1:
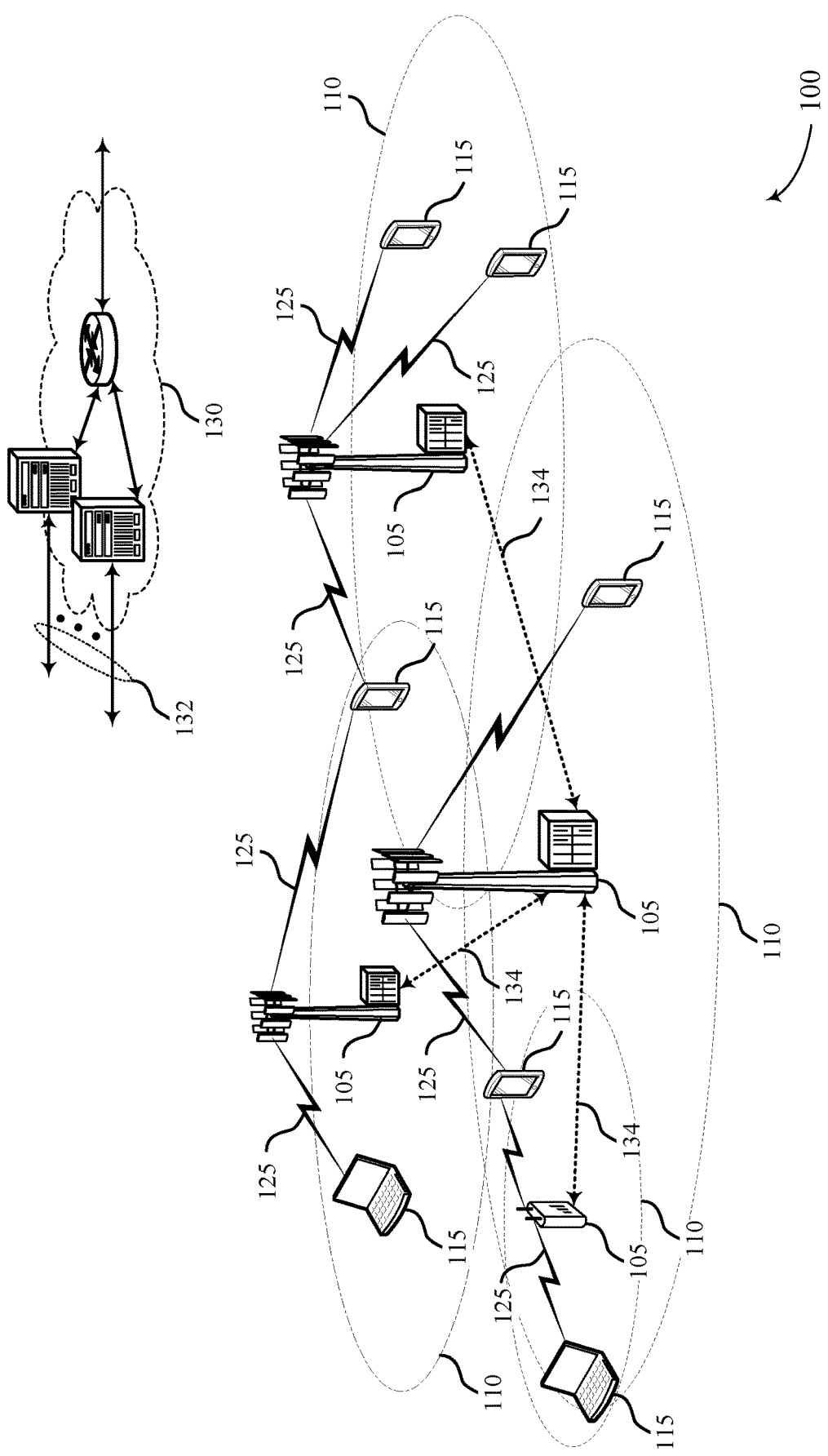
FIG. 1 illustrates an example of a system for wireless communication that supports techniques for signaling quality of service (QoS) class indicators in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

The base station 105 may communicate a QCI to the UE 115 using a control message or a resource allocation message. The QCI may be configured to inform the PHY layer about the QoS class of a transport block. The UE 115 and/or the base station 105 may then be configured to select one or more transmission parameters for the PHY layer to ensure that the QoS conditions of the QoS class are met during the communication. In some cases, an MCS value may be used as the QCI for the PHY layer. In some cases, a CQI value may be used as the QCI for the PHY layer. In some cases, an indicator associated with the MCS value and/or the CQI value may be used as the QCI for the PHY layer. In some cases, a C-RNTI may be used as the QCI for the PHY layer. In some cases, the QCI may be a single bit included in a downlink control message. In some cases, the QCI may be indicated by a payload size of downlink control information.

In some examples, the UE 115 may determine the QCI based on a grant-free configuration. The UE 115 may determine to use the grant-free configuration or one of a set of grant-free configurations based on exchanging signaling (e.g., RRC signaling) with the base station 105. A first subset of the set of grant-free configurations may be associated with a first service or service class (e.g., eMBB, etc.), and a second subset of the set of grant-free configurations may be associated with a second service or service class. In some examples, the grant-free configuration and/or the C-RNTI may serve as a QCI, and the UE 115 may determine one or more transmission parameters based on the grant-free configuration and/or the C-RNTI. Such examples may occur when a grant-free configuration is activated (or automatically activated) by RRC signaling. In some examples, the UE 115 may determine to use the grant-free configuration based on receiving downlink control information (DCI), where the DCI may be scrambled by a C-RNTI. In such examples when DCI scrambled by C-RNTI activates the grant-free configuration, the C-RNTI may be an example of QCI, and the grant-free configuration may indicate the transmission parameters. In such examples when DCI scrambled by C-RNTI activates the grant-free configuration, the C-RNTI may be a common one (e.g., not a QCI), and the grant-free configuration may serve as the QCI.

Figure 2:
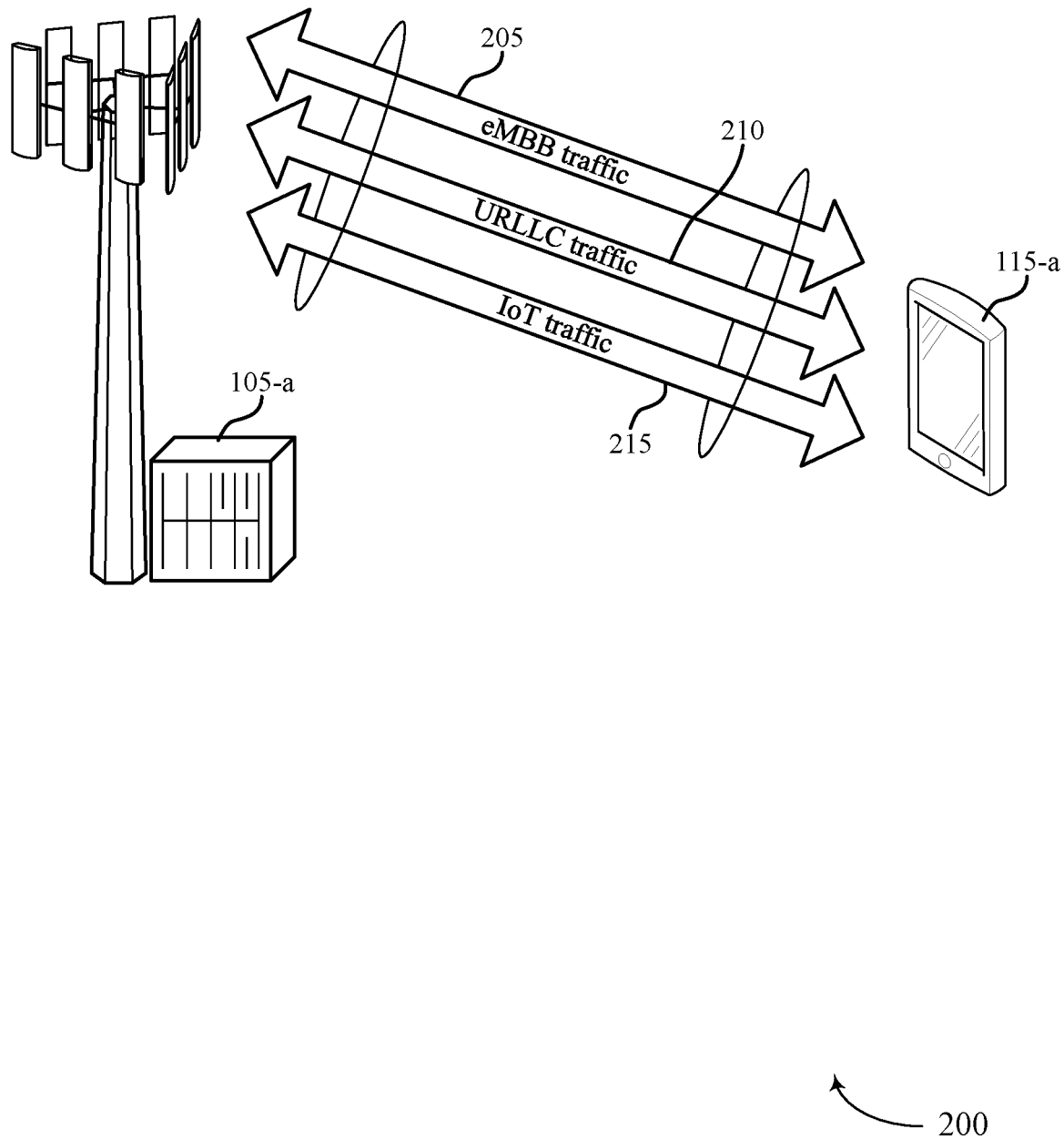
FIG. 2 illustrates an example of a wireless communication system that supports techniques for signaling QoS class indicators in accordance with aspects of the present disclosure.

FIG. 2 illustrates an example of a wireless communications system 200 that supports techniques for signaling QoS class indicators in accordance with various aspects of the present disclosure. In some examples, the wireless communications system 200 may implement aspects of wireless communications system 100. The wireless communications system 200 may include one or more base station 105-a and one or more UEs 115-a.

In the wireless communications system 200, some traffic may have different QoS conditions (e.g., requirements). For example, eMBB traffic 205 may ask for high data throughput, ultra-reliable low-latency communications (URLLC) traffic 210 may ask for ultra-high reliability and low latency for packet delivery, and internet of things (IoT) traffic 215 may ask for connectivity support for a large number of devices that may have relatively small or modest data needs, among other examples with varying aspects or characteristics. Base stations 105-a of the wireless communications system 200 may allocate resources to UEs to meet the disparate demands of these different types of traffic (e.g., eMBB traffic 205, URLLC traffic 210, IoT traffic 215).

In some wireless communications systems, the PHY layer of the wireless communications system may be uninformed about or oblivious to QoS conditions (e.g., requirements) or QoS classes for traffic. In these wireless communications systems, higher layers (e.g., MAC layer and/or above) may manage QoS requirements/classes and the PHY layer may be configured to communicate information as quickly as possible. For example, in some versions of LTE, the PHY layer is not informed regarding QoS requirements for traffic and the PHY layer may apply the same or similar procedures to all traffic. Rather, other layers in LTE handle the QoS procedures.

In the wireless communications system 200, the PHY layer transmission schemes and/or transmission procedures may depend on the QoS requirements/classes of the underlying traffic. For example, in some wireless communications systems, different QoS classes may use different CQI tables, different MCS tables, different slot configurations, different channel configurations, different reference signal configurations, and/or different processing timelines.

It may beneficial to signal QoS information of traffic (e.g., of a transport block) at the PHY layer so that the proper configurations and procedures can be applied when communicating the traffic. Using the QoS information transmission parameters, transmission parameters at the PHY layer may be optimized for the traffic being communicated. In some cases, applying proper procedures may help avoid collisions between traffic of two different QoS classes.

Techniques are described herein for communicating a QCI for configuring PHY layer signaling. The QCI may be used to configure one or more transmission parameters of a device (e.g., a base station or a UE) at a PHY layer. The PHY layer may select the one or more transmission parameters to meet the QoS conditions (e.g., requirements) of a given QoS class of a transport block being communicated. An MCS value may be used as the QCI for the PHY layer, a CQI value may be used as the QCI for the PHY layer, a C-RNTI may be used as the QCI for the PHY layer, or another transmission parameter may be used as the QCI for the PHY layer. In some cases, the QCI may be a single bit included in a downlink control message. In some cases, the QCI may be indicated by a payload size of downlink control information.

In some examples, the UE 115-*a* may determine the QCI based on a grant-free configuration. The UE 115-*a* may determine to use the grant-free configuration or one of a set of grant-free configurations based on exchanging signaling (e.g., RRC signaling) with the base station 105-*b*. A first subset of the set of grant-free configurations may be associated with a first service or service class (e.g., eMBB, URLLC, etc.), and a second subset of the set of grant-free configurations may be associated with a second service or service class. In some examples, the grant-free configuration and/or the C-RNTI may serve as a QCI, and the UE 115-*a* may determine one or more transmission parameters based on the grant-free configuration and/or the C-RNTI. Such examples may occur when a grant-free configuration is activated (or automatically activated) by RRC signaling. In some examples, the UE 115-*a* may determine to use the grant-free configuration based on receiving DCI, where the DCI may be scrambled by a C-RNTI. In such examples when DCI scrambled by C-RNTI activates the grant-free configuration, the C-RNTI may be an example of QCI, and the grant-free configuration may indicate the transmission parameters. In such examples when DCI scrambled by C-RNTI activates the grant-free configuration, the C-RNTI may be a common one (e.g., not a QCI), and the grant-free configuration may serve as the QCI.

Figure 3:
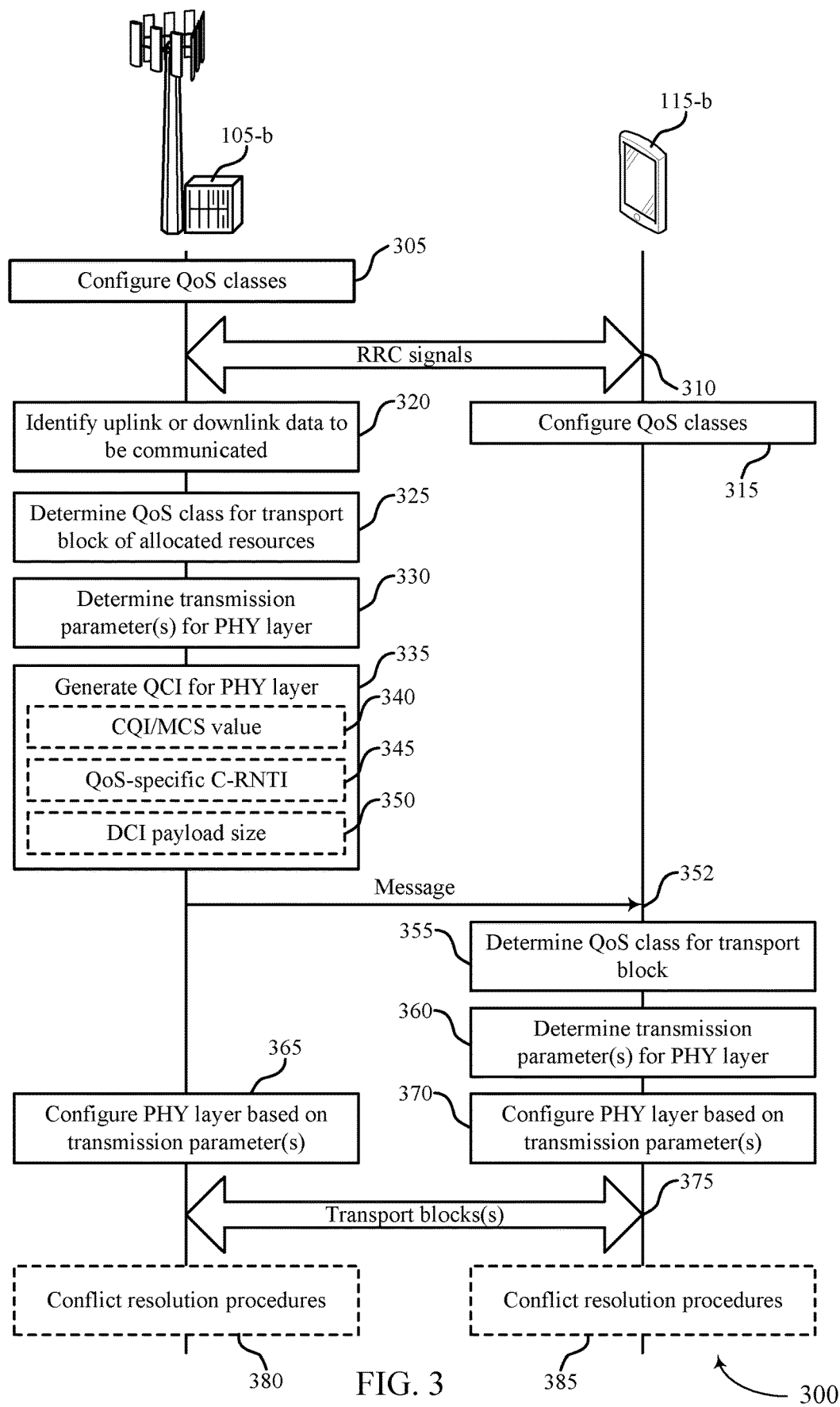
FIG. 3 illustrates an example of a communication scheme that supports techniques for signaling QoS class indicators in accordance with aspects of the present disclosure.

FIG. 3 illustrates an example of a communication scheme 300 that supports techniques for signaling QoS class indicators in accordance with various aspects of the present disclosure. In some examples, the communication scheme 300 may implement aspects of wireless communications systems 100 or 200. The communication scheme 300 illustrates functions performed by and communication exchanged between a base station 105-*b* and a UE 115-*b*. The communication scheme 300 illustrates procedures and communications for communicating a QCI for configuring PHY layer signaling based on QoS classes of transport blocks being communicated.

At block 305, the base station 105-*b* may configure the QoS classes that may be used when communicating with the UE 115-*b*. The base station 105-*b* and the UE 115-*b* may exchange one or more radio resource control (RRC) signals 310 as part of the configuration. The RRC signals 310 may include information about what QoS class a device (e.g., base station 105-*b* and UE 115-*b*) is capable of using. The RRC signals 310 may also include information from the base station 105-*b* to the UE 115-*b* about which QoS classes should be configured for the communication link between the base station 105-*b* and the UE 115-*b*. In some examples, the RRC signals 310 may include information from the base station 105-*b* to the UE 115-*b* configuring the UE 115-*b* to use a grant-free configuration for determining the QoS class. At block 315, the UE 115-*b* may configure the QoS classes. In some examples, the UE 115-*b* may configure the QoS classes based on information received from the base station 105-*b*. The procedures of blocks 305 and/or 315 may be performed before, after, or while communicating the RRC signals 310.

At block 320, the base station 105-*b* may identify uplink or downlink data to be communicated between the base station 105-*b* and the UE 115-*b*. In the communication system, the base station 105-*b* may schedule communications between the base station 105-*b* and UEs served by the base station 105-*b* (e.g., UE 115-*b*). The base station 105-*b* may allocate resources based on data waiting to be communicated by the base station 105-*b* (e.g., downlink) or data waiting to be communicated by the UE 115-*b* (e.g., uplink).

At block 325, the base station 105-*b* may determine a QoS class for at least a portion of the data to be communicated between the base station 105-*b* and the UE 115-*b*. For example, the base station 105-*b* may determine a QoS class for a transport block to be communicated between the base station 105-*b* and the UE 115-*b*. The QoS class of the transport block may be indicative of the transmission requirements for that transport block. For example, if the transport block is a URLLC communication (e.g., a URLLC QoS class), the transmission requirements of the transport block may be different than an eMBB communication (e.g., an eMBB QoS class). In some cases, the base station 105-*b* may schedule a transport block to use a QoS class that may be different than a QoS class indicated by the underlying data.

At block 330, the base station 105-*b* may determine one or more transmission parameters for the PHY layer for transmitting the transport block with the identified QoS class. For example, a base station 105-*b* may use beam forming transmission techniques and/or directional beams to communicate transport blocks of a first QoS class and the base station 105-*b* may use other transmission techniques (e.g., omnidirectional) to communicate transport blocks of a second QoS class. In some cases, different transmission parameters values may be selected for a single QoS class. For example, a first QoS class may define two possible slot structures. In these cases, the base station 105-*b* may select the transmission parameters based on the QoS class and based on other factors.

Examples of transmission parameters for the PHY layer may include, but are not limited to, an MCS value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for channel state information (CSI) reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of a sounding reference signal (SRS), a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a hybrid automatic repeat request acknowledgement (HARQ-ACK), or a combination thereof.

At block 335, the base station 105-*b* may generate a QCI for the PHY layer to indicate a QoS class of the transport block to be communicated. The QCI may be included a variety of different places. In some cases, as in at block 340, the QCI for the PHY layer may be incorporated with an MCS value or entry or a CQI value or entry. In some cases, as in at block 340, the QCI for the PHY layer may be incorporated with a QoS-specific C-RNTI. In some cases, the QCI for the PHY layer may be incorporated with a size of a payload of DCI in the message 352.

At block 340, the base station 105-*b* may generate the QCI using an MCS value or a CQI value. In some cases, the base station 105-*b* may generate a new field in a resource allocation message that indicates the QoS class of the transport block. For example, if the communication link supports two QoS classes (e.g., an eMBB QoS class and a URLLC QoS class), the base station 105-*b* may generate a single bit indicator that acts as a QCI. In effect, the indicator may inform the UE 115-*b* which table to use to interpret the accompanying MCS value and/or CQI value. The UE 115-*b* may have different look-up tables for each QoS class. MCS index values and/or CQI index values may be reused between QoS classes and as such an indication of which table to use may be necessary to configure the correct transmission parameters. In some cases, the indicator may be more than one bits, especially if the communication link supports more than two QoS classes. The UE 115-*b* may be configured to determine the QoS class of the transport block based on the indicator or field associated with the MCS value or the CQI value.

In some cases, the QCI may be inferred directly from the MCS value or the CQI value. In such cases, an MCS value or a CQI value may be associated with a single QoS class. The base station 105-*b* may select the MCS value or the CQI value based on QoS class of the transport block being communicated. The UE 115-*b* may be configured to determine the QoS class of the transport block based on the MCS value or the CQI value.

At block 345, the base station 105-*b* may generate a C-RNTI of the UE 115-*b* that is associated with the QoS class of the transport block being communicated. In such cases, the UE 115-*b* may be configured with multiple C-RNTIs. In some cases, the UE 115-*b* may be assigned a different C-RNTI for each QoS class supported by the communication link. For example, if the communication link supports two QoS classes, the UE 115-*b* may have two unique C-RNTIs. In such cases, each C-RNTI may be an example of a QoS class-specific C-RNTI. The UE 115-*b* may be configured to determine the QoS class of the transport block based on the C-RNTI.

At block 350, the base station 105-*b* may generate DCI of the message 352 for the UE 115-*b* that is associated with the QoS class of the transport block being communicated. The payload size of the DCI may be different for different QoS classes. For example, the payload size of the DCI for an eMBB transport block may be different than the payload size for a URLLC transport block. The base station 105-*a* select the payload size of the DCI based on the QoS class of the transport block. In some cases, the QoS class of a transport block may be determined using a MCS value, a CQI value, a C-RNTI, a DCI payload size, or any combination thereof. In some cases, the QoS class of a transport block may be inferred using the MCS value and/or the C-RNTI but not using the DCI payload size.

The base station 105-*b* may generate a message 352 that includes the QCI for the PHY layer (e.g., either an MCS/CQI value, an indicator, or a QoS class-specific C-RNTI). The message 352 may be an example of an uplink control message, an uplink resource allocation message, a downlink control message, a downlink resource allocation message, or a combination thereof. The QCI for the transport block may be communicated by the base station 105-*b* when communicating either using uplink or downlink. In uplink contexts, the base station 105-*b* may transmit a grant of resources to be used by the UE 115-*b* to transmit the transport block. In downlink contexts, the base station 105-*b* may inform the UE 115-*b* that transport blocks are coming and that the UE 115-*b* should be configured properly to receive the transport blocks. The message 352 may be communicated using the physical downlink control channel (PDCCH).

At block 355, the UE 115-*b* may determine a QoS class for a transport block that is to be communicated. In some examples, the UE 115-*b* may determine the QoS class based on receiving the message 352. The base station 105-*b* when allocating communication resources may also determine the QoS classes for the various transports blocks to be communicated. To determine the QoS class for the transport block, the UE 115-*b* may in some examples identify an indicator in the message 352, determine an MCS value or a CQI value used in the message 352, determine a C-RNTI in the message 352, or a combination thereof. In some examples, the UE 115-*b* may determine a transmission parameter by identifying a C-RNTI and/or the grant-free configuration of the UE. The base station 105-*b* and the UE 115-*b* may exchange signaling to allow the UE 115-*b* to operate using a grant-free configuration.

In some cases, the QCI may be incorporated into the MCS value or CQI value or may be a new indicator or new field associated with the MCS value or the CQI value. In some examples, the UE 115-*b* may identify the MCS value and/or the CQI value associated with the transport block and determine the QoS class of the transport block from that. In some examples, the UE 115-*b* may identify an indicator that indicates the QoS class or indicates the table which is associated with the MCS value and/or the CQI value. In some examples, the UE 115-*b* may determine the QoS class from the MCS value and/or the CQI value directly. In such examples, the MCS value and/or the CQI value may be associated with a single QoS class.

In some cases, the QCI may be incorporated into a C-RNTI included in the message 352. Upon receiving the message 352, the UE 115-*b* may determine if the C-RNTI is associated with a specific QoS class. The UE 115-*b* may be configured with a plurality of C-RNTIs, each C-RNTI being associated with a different QoS classes. The UE 115-*b* may identify which C-RNTI of the plurality of C-RNTIs is included in the message 352 and identify the QoS class of the transport block in the message 352 based on identifying the C-RNTI. In some cases, the UE 115-*b* may perform one or more blind decoding operations on the message 352 to determine which C-RNTI is included in the message. For example, if communication link supports two QoS classes, the UE 115-*b* may perform up to two blind decoding operations on the message 352, a first decoding operation using a first C-RNTI and a second decoding operation using a second C-RNTI.

In some cases, the QCI may be incorporated into DCI information of the message 352. The payload size of the DCI may be different for different QoS classes. For example, the payload size of the DCI for an eMBB transport block may be different than the payload size for a URLLC transport block. In some examples, the UE 115-*b* may blindly decode the message 352 using different DCI sizes. The UE 115-*b* may determine the size of the DCI based on the message 352 that is successfully decoded using one of the plurality of different DCIs.

At block 360, the UE 115-*b* may determine one or more transmission parameters for the transport block based on the QoS class of the transport block. Examples of the different types of transmission parameters that the UE 115-*b* may identify and/or configure is provided above and is not repeated here.

At blocks 365 and 370, the base station 105-*b* and the UE 115-*b* may use the one or more transmission parameters determined based on the QoS class of the transport block to configure the PHY layer to communicate the transport block. The base station 105-*b* and the UE 115-*b* may communicate the transport blocks 375 either in uplink or downlink using the transmission parameters of the PHY layer.

In some cases, two transport blocks having different QoS classes may collide. For example, an eMBB transport block may be scheduled for a first slot, but a URLLC transport block may come and interrupt that transport block. At blocks 380 and 385, the base station 105-*b* and/or the UE 115-*b* may use the QCI for the PHY layer to avoid and/or resolve collisions between transport blocks of different QoS classes.

When the UE 115-*b* receives a second message allocating additional resources, the UE 115-*b* may determine whether the second message allocates the same communication resources as the message 352. If both messages allocate resources for a single communication resource, the UE 115-*b* may use the QoS classes of the different messages to determine which data should be transmitted. For example, the UE 115-*b* may give priority to a URLLC transport block over an eMBB transport block.

In some cases, the UE 115-*b* may allocate resources using one or more grant-free scheduling operations. In such grant-free operations, the UE 115-*b* may be configured to select resources to use without receiving a grant message from the base station 105-*b*. In such operations, the UE 115-*b* may receive RRC signals 310 which include information from the base station 105-*b* to the UE 115-*b* for configuring the UE 115-*b* to use a grant-free configuration for determining the QoS class. Based on the grant-free configuration that is either RRC-configured or activated by a DCI scrambled by a C-RNTI, the UE 115-*b* may determine a transmission parameter for the UE 115-*b*. At 335, the UE 115-*b* may determine a QoS class. The UE 115-*b* may determine the QoS class based on the transmission parameter, or determine the QoS class associated with the C-RNTI and the associated grant-free configuration from a set of QoS classes based on identifying the C-RNTI and the associated grant-free configuration. The base station 105-*b* and the UE 115-*b* may communicate the transport blocks 375 based on determining the QoS class.

Figure 4:
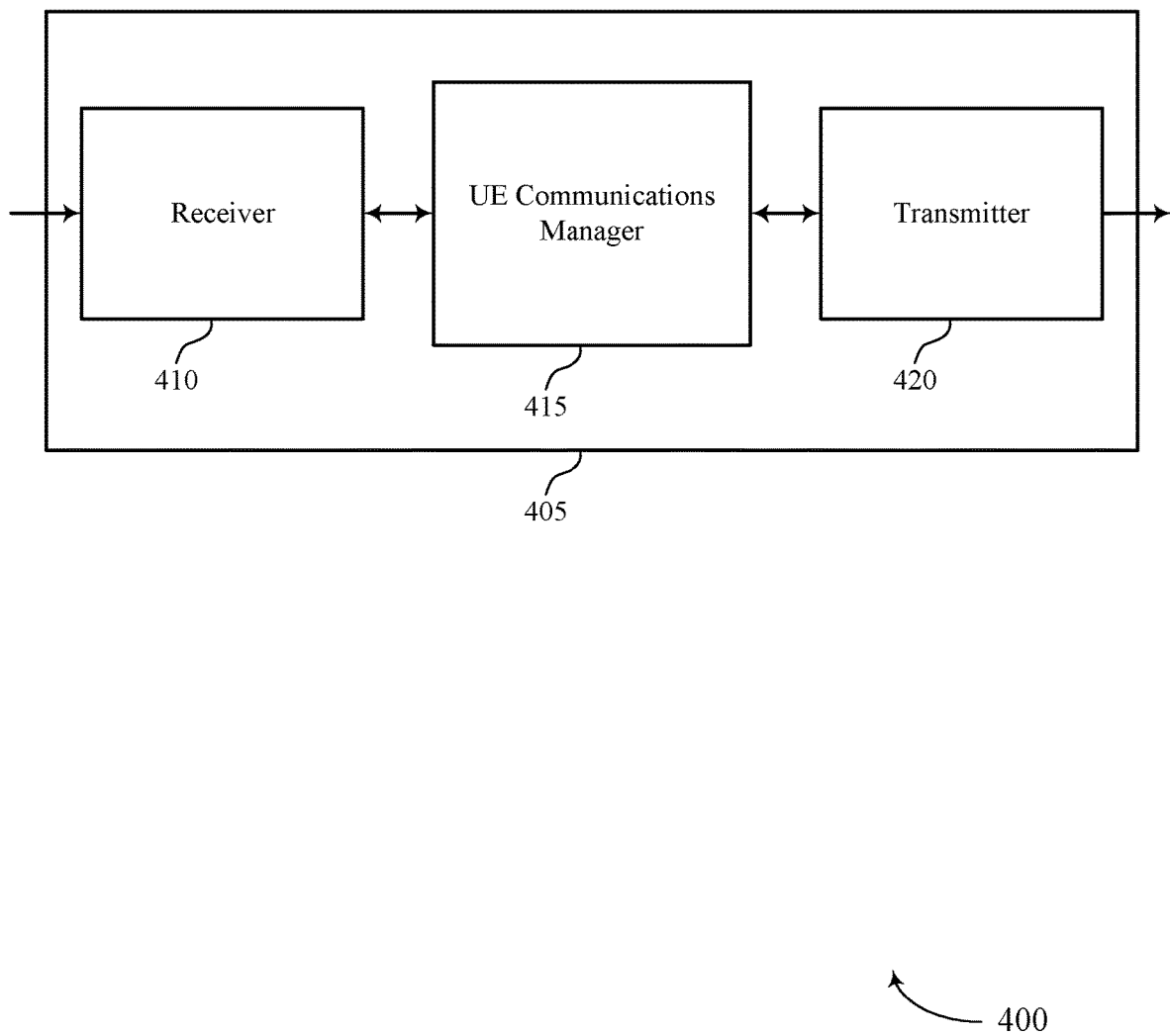
FIGS. 4 through 6 show block diagrams of a device that supports techniques for signaling QoS class indicators in accordance with aspects of the present disclosure.

FIG. 4 shows a block diagram 400 of a wireless device 405 that supports techniques for signaling QoS class indicators in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to techniques for signaling QoS class indicators, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure. The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive, by a UE, a message that includes a transmission parameter for the UE, determine a QoS class of a transport block based on the transmission parameter included in the message, and communicate, with a base station, the transport block using a transmission parameter for a PHY layer of the transport block based on determining the QoS class. The UE communications manager 415 may also receive a message that includes a C-RNTI for a UE, determine a QoS class associated with the C-RNTI from a set of QoS classes based on receiving the message, and communicate, with a base station, a transport block using a transmission parameter for the PHY layer based on determining the QoS class associated with the C-RNTI. The UE communications manager 415 may identify a size of a payload of the DCI based on receiving the message and determine a QoS class of a transport block based on identifying the size of the payload of the DCI.

The UE communications manager 415 may determine, by a UE, a transmission parameter for the UE, determine a QoS class of a transport block based on the transmission parameter, and communicate, with a base station, the transport block using the transmission parameter for a PHY layer of the transport block based on determining the QoS class. The UE communications manager 415 may also identify a C-RNTI for a UE, determine a QoS class associated with the C-RNTI from a set of QoS classes based on determining the C-RNTI, and communicate, with a base station, a transport block using a transmission parameter for a PHY layer based on determining the QoS class associated with the C-RNTI. The UE communications manager 415 may be an example of aspects of the UE communications manager 715 described herein.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
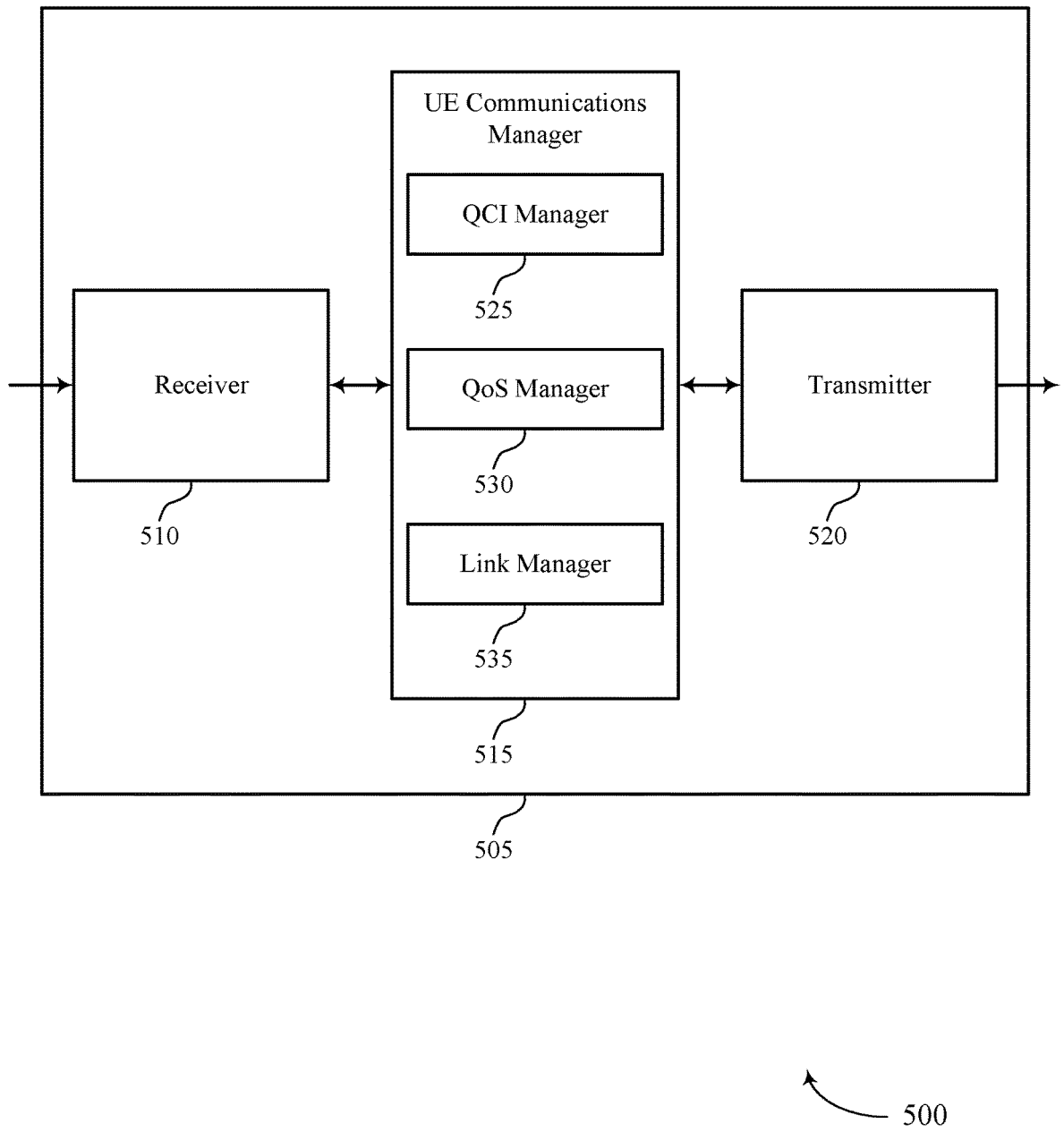

FIG. 5 shows a block diagram 500 of a wireless device 505 that supports techniques for signaling QoS class indicators in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for signaling QoS class indicators, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include QCI manager 525, QoS manager 530, and link manager 535.

QCI manager 525 may receive a message that includes a transmission parameter for the UE or receive a message that includes a C-RNTI for a UE. In some cases, the transmission parameter may be configured as a QCI for PHY layer signaling. In some cases, the message may be an uplink control/resource allocation message or a downlink control/resource allocation message communicated using a PDCCH. In some cases, the C-RNTI may be configured as a QCI for PHY layer signaling. In some cases, the message may be an uplink control/resource allocation message or a downlink control/resource allocation message communicated using a PDCCH. The QCI manager 525 may identify a size of a payload of the DCI based on receiving the message and determine a QoS class of a transport block based on identifying the size of the payload of the DCI.

QCI manager 525 may determine, by a UE, a transmission parameter for the UE. QCI manager 525 may identify a C-RNTI for a UE.

QoS manager 530 may determine a QoS class of a transport block based on the transmission parameter included in the message or determine a QoS class associated with the C-RNTI from a set of QoS classes based on receiving the message. In some cases, the QoS class may be an eMBB QoS class or an URLLC QoS class. QoS manager 530 may identify a size of a payload of the DCI based on receiving the message, determine a QoS class of a transport block based on identifying the size of the payload of the DCI, and decode the message using at least one of a first DCI size associated with a first QoS class or a second DCI size associated with a second QoS class (or both), where determining the QoS class is based on whether the decoding was successful with the first DCI size or the second DCI size. In some cases, a first size of the payload of the DCI for an eMBB QoS class may be different than a second size of the payload of the DCI for a URLLC QoS class.

The QoS manager 530 may determine a QoS class of a transport block based on the determined transmission parameter. The QoS manager 530 may determine a QoS class associated with the C-RNTI from a set of QoS classes based on determining the C-RNTI.

Link manager 535 may communicate, with a base station, the transport block using the transmission parameter for a PHY layer of the transport block based on determining the QoS class or communicate, with a base station, a transport block using a transmission parameter for a PHY layer based on determining the QoS class associated with the C-RNTI.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
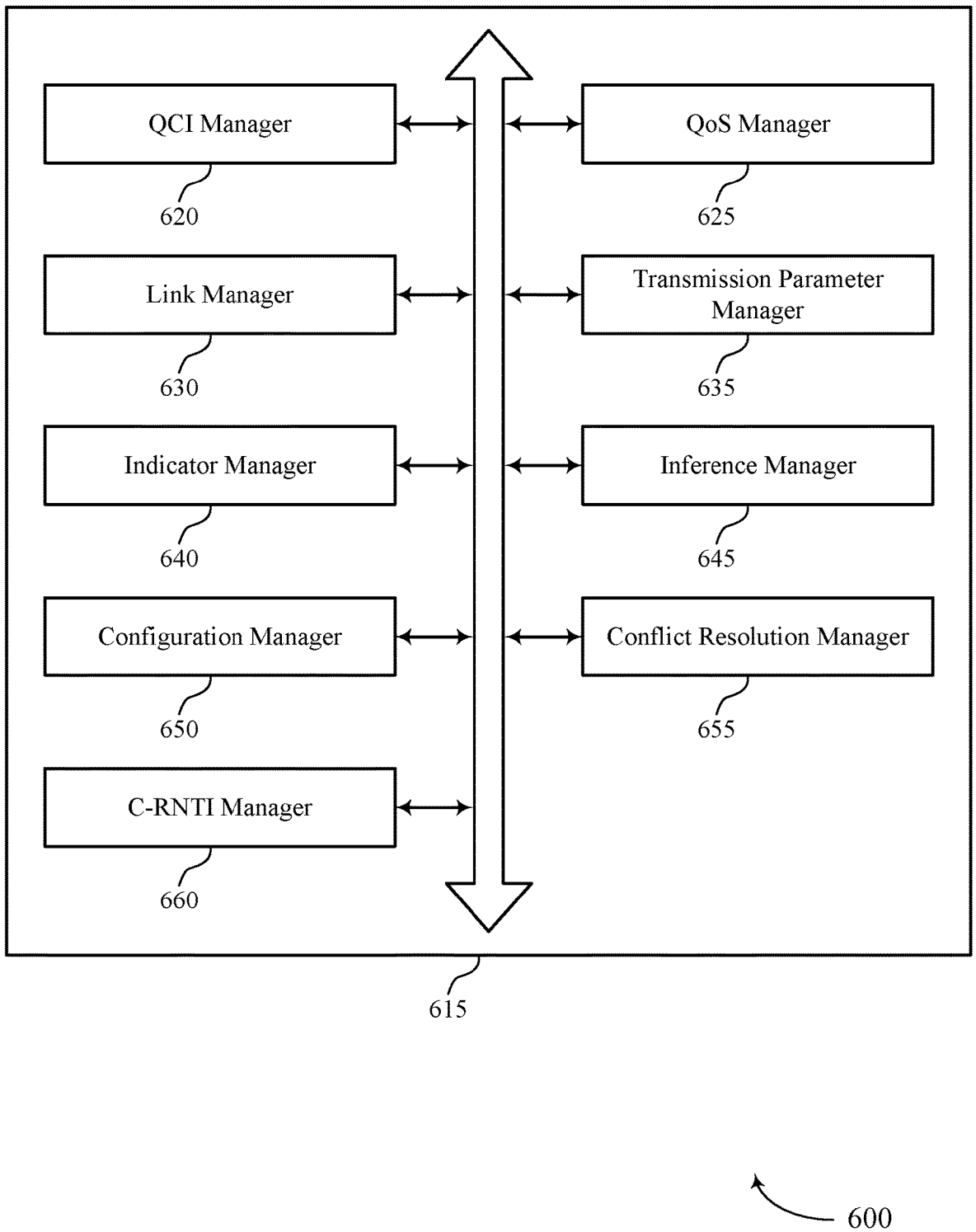

FIG. 6 shows a block diagram 600 of a UE communications manager 615 that supports techniques for signaling QoS class indicators in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include QCI manager 620, QoS manager 625, link manager 630, transmission parameter manager 635, indicator manager 640, inference manager 645, configuration manager 650, conflict resolution manager 655, and C-RNTI manager 660. Each of these modules may communicate, directly or indirectly, with one another (e.g., via one or more buses).

QCI manager 620 may receive a message that includes a transmission parameter for the UE or receive a message that includes a C-RNTI for a UE. In some cases, the transmission parameter may be configured as a QCI for PHY layer signaling. In some cases, the message may be an uplink control/resource allocation message or a downlink control/resource allocation message communicated using a PDCCH. In some cases, the C-RNTI may be configured as a QCI for PHY layer signaling. In some cases, the message may be an uplink control/resource allocation message or a downlink control/resource allocation message communicated using a PDCCH. QCI manager 620 may receive a message that includes DCI for the UE. The QCI manager 620 may identify a size of a payload of the DCI based on receiving the message and determine a QoS class of a transport block based on identifying the size of the payload of the DCI.

The QCI manager 620 may determine, by a UE, a transmission parameter for the UE. In some examples, the QCI manager 620 may identify a C-RNTI for a UE. In some cases, the transmission parameter may be configured as a QCI for PHY layer signaling. In some cases, the C-RNTI is configured as a QCI for PHY layer signaling.

QoS manager 625 may determine a QoS class of a transport block based on the transmission parameter included in the message or determine a QoS class associated with the C-RNTI from a set of QoS classes based on receiving the message. In some cases, the QoS class may be an eMBB QoS class or an URLLC QoS class. QoS manager 625 may identify a size of a payload of the DCI based on receiving the message, determine a QoS class of a transport block based on identifying the size of the payload of the DCI, and decode the message using at least one of a first DCI size associated with a first QoS class or a second DCI size associated with a second QoS class (or both), where determining the QoS class is based on whether the decoding was successful with the first DCI size or the second DCI size. In some cases, a first size of the payload of the DCI for an eMBB QoS class may be different than a second size of the payload of the DCI for a URLLC QoS class.

The QoS manager 625 may determine a QoS class of a transport block based on the determined transmission parameter. In some examples, the QoS manager 625 may determine a QoS class associated with the C-RNTI from a set of QoS classes based on determining the C-RNTI. In some cases, the C-RNTI may indicate an eMBB QoS class or a URLLC QoS class.

Link manager 630 may communicate, with a base station, the transport block using the transmission parameter for a PHY layer of the transport block based on determining the QoS class or communicate, with a base station, a transport block using a transmission parameter for a PHY layer based on determining the QoS class associated with the C-RNTI. Link manager 630 may communicate, with a base station, the transport block using a transmission parameter for a PHY layer of the transport block based on determining the QoS class.

The link manager 630 may communicate, with a base station, the transport block using the transmission parameter for a PHY layer of the transport block based on determining the QoS class. In some examples, the link manager 630 may communicate, with a base station, a transport block using a transmission parameter for a PHY layer based on determining the QoS class associated with the C-RNTI.

Transmission parameter manager 635 may determine the transmission parameter for the PHY layer of the transport block based on determining the QoS class, where communicating the transport block may be based on determining the transmission parameter and determine the transmission parameter for the PHY layer of the transport block based on determining the QoS class associated with the C-RNTI, where communicating the transport block may be based on determining the transmission parameter. In some cases, the transmission parameter may be an MCS value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof. Transmission parameter manager 635 may determine the transmission parameter for the PHY layer of the transport block based on determining the QoS class, where communicating the transport block may be based on determining the transmission parameter.

Indicator manager 640 may identify, in the message, an indicator of the QoS class associated with the transmission parameter, where determining the QoS class may be based on identifying the indicator. In some cases, identifying the indicator may include identifying a single bit that indicates an eMBB QoS class or an URLLC QoS class. In some cases, identifying the indicator may include identifying the indicator in a field of DCI in the message.

The indicator manager 640 may identify an indicator of the QoS class associated with the transmission parameter, where determining the QoS class may be based on identifying the indicator.

Inference manager 645 may determine the QoS class based on the transmission parameter, where determining the transmission parameter may be based on determining the QoS class.

Configuration manager 650 may configure the UE to use a set of QoS classes, at least one of which includes the determined QoS class, where receiving the message may be based on configuring the UE to use the set of QoS classes.

The configuration manager 650 may determine the transmission parameter for the UE is based on a grant-free configuration of the UE. In some examples, the configuration manager 650 may configure the UE to use a set of QoS classes, at least one of which includes the determined QoS class, where determining the transmission parameter is based on configuring the UE to use the set of QoS classes. In some examples, the configuration manager 650 may identify the C-RNTI for the UE is based on a grant-free configuration of the UE. In some examples, the configuration manager 650 may configure the UE with a set of C-RNTIs, at least one of which includes the identified C-RNTI, where each C-RNTI of the set of C-RNTIs is associated with a different QoS class. In some examples, the configuration manager 650 may configure the UE to use the set of QoS classes, the determined QoS class being one of the set of configured QoS classes, where identifying the C-RNTI is based on configuring the UE to use the set of QoS classes.

Conflict resolution manager 655 may receive a second message that includes a second transmission parameter associated with second QoS class different from the QoS class, determine that both the message and the second message allocate resources for a single communication resource, select the QoS class or the second QoS class to communicate with during the single communication resource based on a conflict resolution procedure. Additionally or alternatively, conflict resolution manager 655 may receive a second message that includes a second C-RNTI associated with second QoS class different from the QoS class.

C-RNTI manager 660 may configure the UE with the set of C-RNTIs at least one of which includes the C-RNTI, where each C-RNTI of the set of C-RNTIs may be associated with a different QoS class. In some cases, the C-RNTI indicates an eMBB QoS class or an URLLC QoS class.

Figure 7:
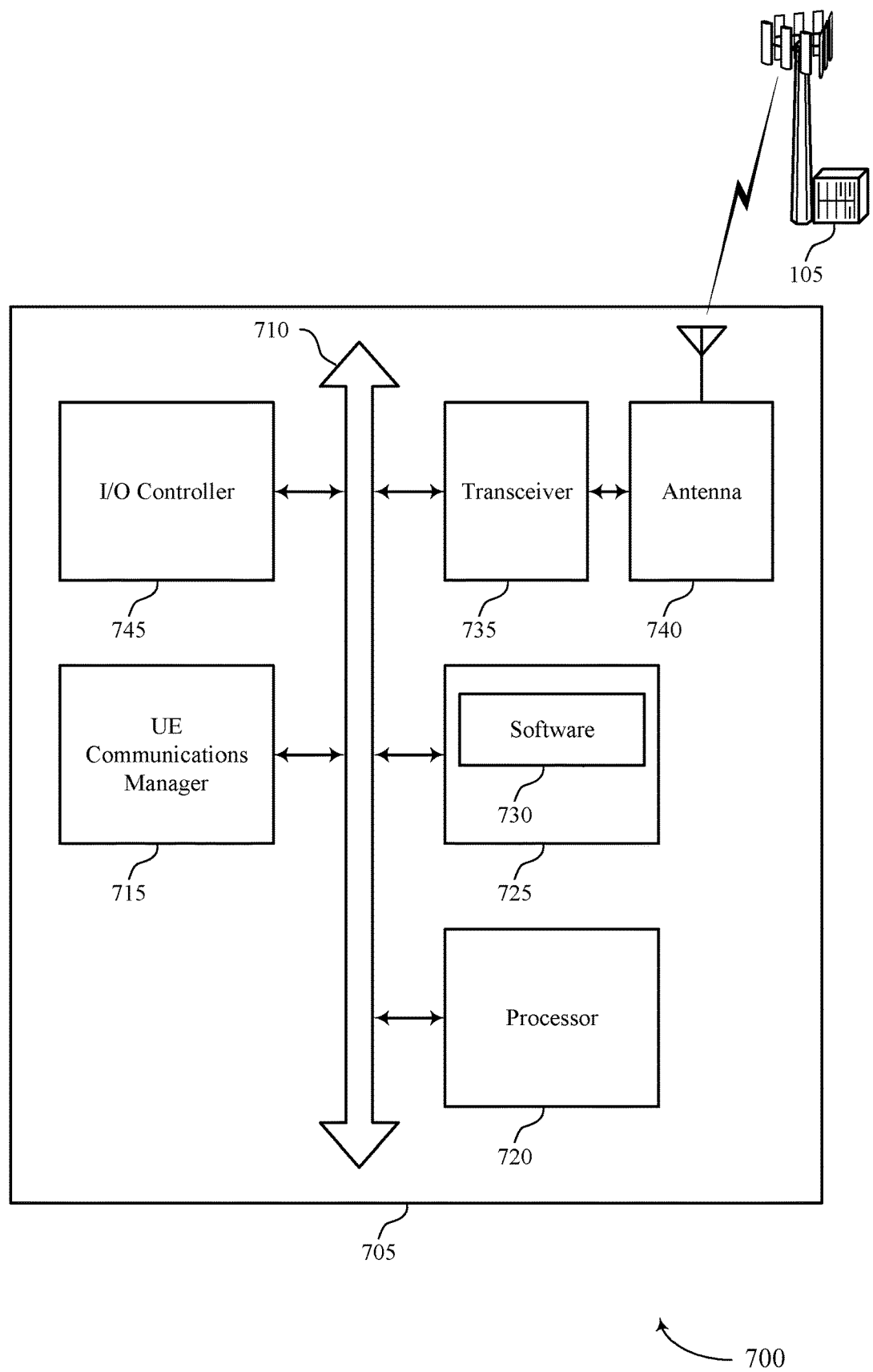
FIG. 7 illustrates a block diagram of a system including a UE that supports techniques for signaling QoS class indicators in accordance with aspects of the present disclosure.

FIG. 7 shows a diagram of a system 700 including a device 705 that supports techniques for signaling QoS class indicators in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting techniques for signaling QoS class indicators).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support techniques for signaling QoS class indicators. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions. I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
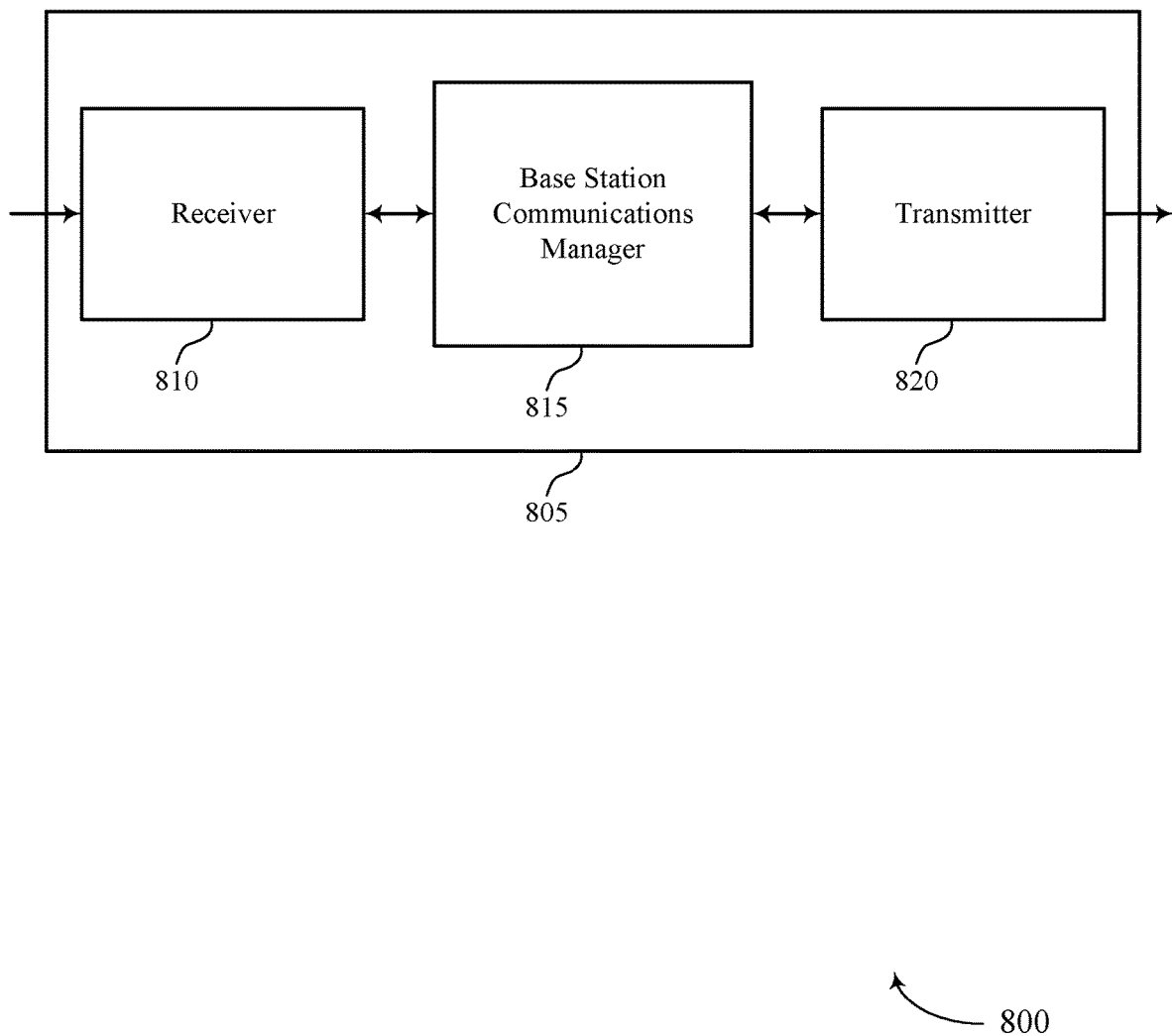
FIGS. 8 through 10 show block diagrams of a device that supports techniques for signaling QoS class indicators in accordance with aspects of the present disclosure.

FIG. 8 shows a block diagram 800 of a wireless device 805 that supports techniques for signaling QoS class indicators in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for signaling QoS class indicators, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may determine a QoS class of a transport block, transmit a message that includes a transmission parameter for a UE that indicates the QoS based on determining the QoS class, and communicate, with the UE, the transport block using the transmission parameter for a PHY layer, the transmission parameter being associated with the QoS class of the transport block. The base station communications manager 815 may also determine a QoS class of a transport block, transmit a message that includes a C-RNTI for a UE based on determining the QoS class, and communicate, with the UE, the transport block using a transmission parameter for a PHY layer, the transmission parameter being associated with the QoS class of the transport block.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
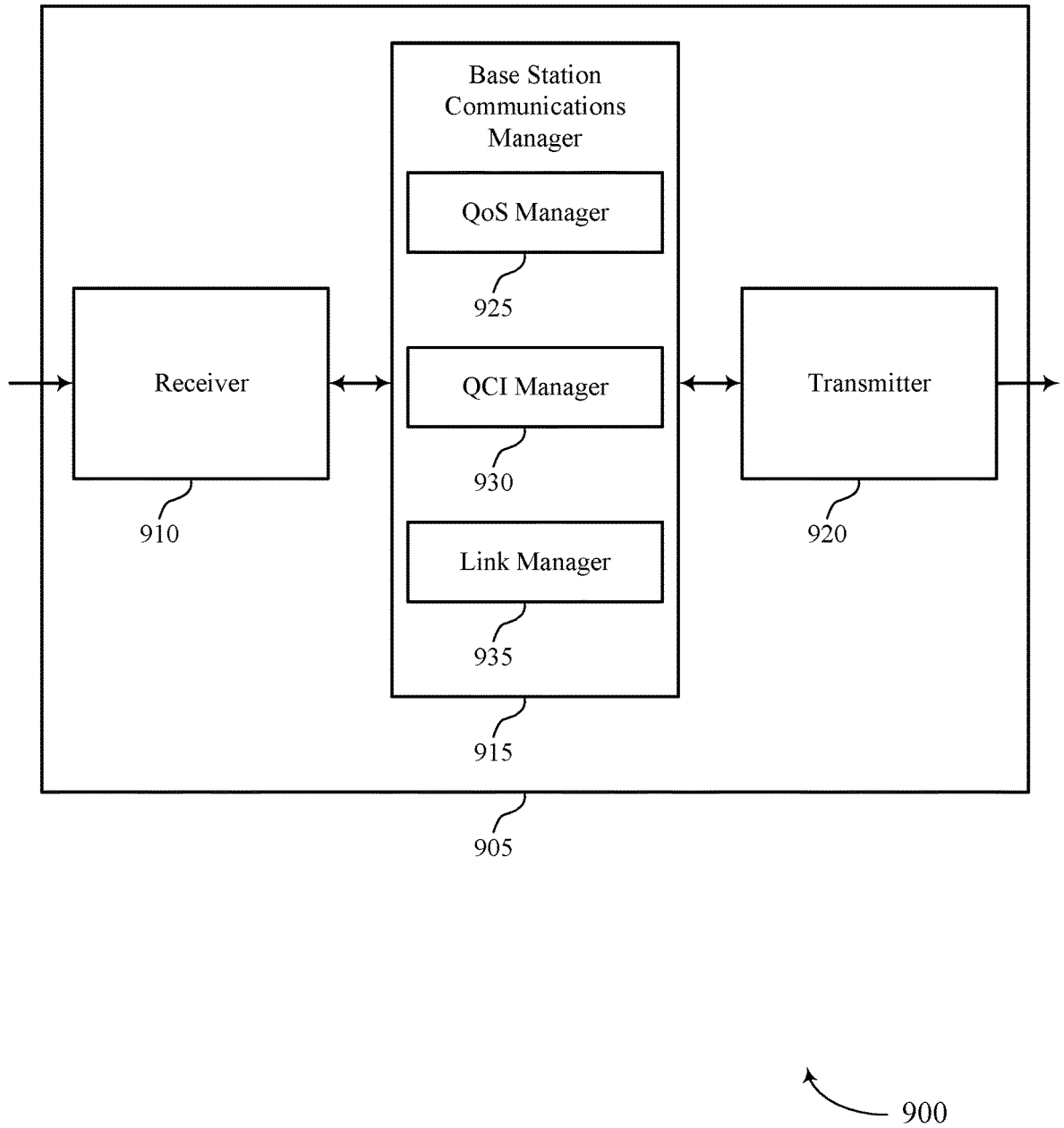

FIG. 9 shows a block diagram 900 of a wireless device 905 that supports techniques for signaling QoS class indicators in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for signaling QoS class indicators, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include QoS manager 925, QCI manager 930, and link manager 935.

QoS manager 925 may determine a QoS class of a transport block. In some cases, the QoS class may be an eMBB QoS class or an URLLC QoS class.

QCI manager 930 may transmit a message that includes a transmission parameter for a UE that indicates the QoS based on determining the QoS class or transmit a message that includes a C-RNTI for a UE based on determining the QoS class. In some cases, the transmission parameter may be configured as a QCI for PHY layer signaling. In some cases, the message may be an uplink control/resource allocation message or a downlink control/resource allocation message communicated using a PDCCH. In some cases, the C-RNTI may be configured as a QCI for PHY layer signaling. In some cases, the message may be an uplink control/resource allocation message or a downlink control/resource allocation message communicated using a PDCCH.

Link manager 935 may communicate, with the UE, the transport block using a transmission parameter for a PHY layer, the transmission parameter being associated with the QoS class of the transport block.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
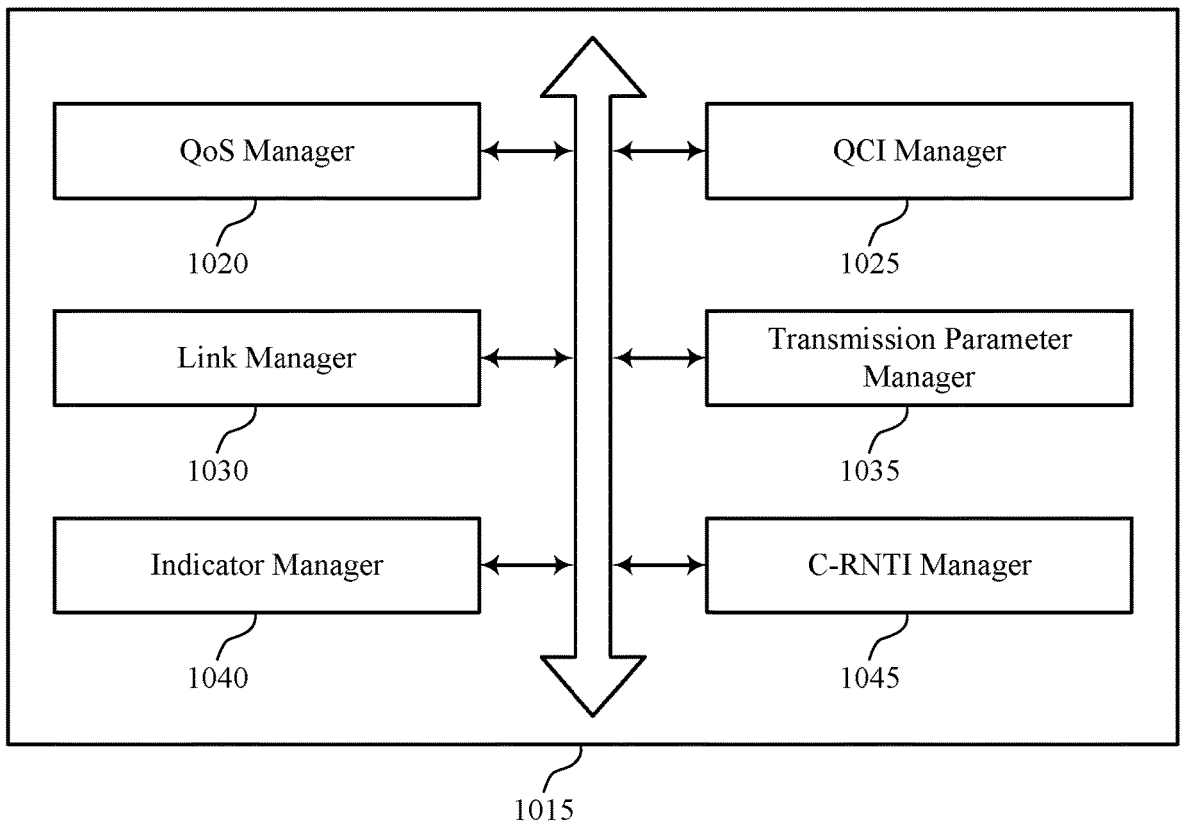

FIG. 10 shows a block diagram 1000 of a base station communications manager 1015 that supports techniques for signaling QoS class indicators in accordance with aspects of the present disclosure. The base station communications manager 1015 may be an example of aspects of a base station communications manager 1115 described with reference to FIGS. 8, 9, and 11. The base station communications manager 1015 may include QoS manager 1020, QCI manager 1025, link manager 1030, transmission parameter manager 1035, indicator manager 1040, and C-RNTI manager 1045. Each of these modules may communicate, directly or indirectly, with one another (e.g., via one or more buses).

QoS manager 1020 may determine a QoS class of a transport block. In some cases, the QoS class may be an eMBB QoS class or an URLLC QoS class. QoS manager 1020 may determine a QoS class of a transport block and identify the size of the payload of the DCI based on determining the QoS class, where transmitting the message may be based on identifying the size of the payload. In some cases, a first size of the payload of the DCI for an eMBB QoS class may be different than a second size of the payload of the DCI for a URLLC QoS class.

QCI manager 1025 may transmit a message that includes a transmission parameter for a UE that indicates the QoS based on determining the QoS class or transmit a message that includes a C-RNTI for a UE based on determining the QoS class. In some cases, the transmission parameter may be configured as a QCI for PHY layer signaling. In some cases, the message may be an uplink control/resource allocation message or a downlink control/resource allocation message communicated using a PDCCH. In some cases, the C-RNTI may be configured as a QCI for PHY layer signaling. In some cases, the message may be an uplink control/resource allocation message or a downlink control/resource allocation message communicated using a PDCCH. QCI manager 1025 may transmit a message that includes DCI for a UE, the DCI having a size of a payload that indicates the QoS based on determining the QoS class.

Link manager 1030 may communicate, with the UE, the transport block using a transmission parameter for a PHY layer, the transmission parameter being associated with the QoS class of the transport block.

Transmission parameter manager 1035 may determine the transmission parameter for the PHY layer of the transport block based on transmitting the message, where communicating the transport block may be based on determining the transmission parameter. In some cases, the transmission parameter may be an MCS value, an MCS table, a CQI table a type of resource allocation on either downlink or uplink, a granularity of resource allocation on either downlink or uplink, a power loop control, power boost, control monitoring, a time-domain configuration for control monitoring, a search space for control monitoring, a format of DCI for control monitoring, a size of DCI for control monitoring, a configuration of control and data repetition for control monitoring, an aggregation level for control monitoring, a timing for CSI reporting by the UE, a timing adjustment for CSI reporting by the UE, a command for CSI reporting by the UE, a loop for CSI reporting by the UE, a granularity for CSI reporting by the UE, a triggering event for CSI reporting by the UE, a measuring parameter for CSI reporting by the UE, a triggering event of an SRS, a measuring parameter of the SRS, a reporting of the SRS by the UE, a starting time and a duration for a control channel, a starting time and a duration for a data channel, a configuration for reference signals, a processing timeline of downlink data and/or uplink data preparation and transmission, a processing timeline of a HARQ-ACK, or a combination thereof.

Indicator manager 1040 may generate an indicator to include in the message that indicates the QoS class associated with the transmission parameter, where transmitting the message may be based on generating the indicator. In some cases, generating the indicator may further include generating a single bit that indicates an eMBB QoS class or an URLLC QoS class. In some cases, generating the indicator may further include generating the indicator in a field of DCI in the message.

C-RNTI manager 1045 may configure the UE with a set of C-RNTIs at least one of which includes the C-RNTI, each C-RNTI of the set of C-RNTIs being associated with a different QoS class. In some cases, the C-RNTI may indicate an eMBB QoS class or an URLLC QoS class.

Figure 11:
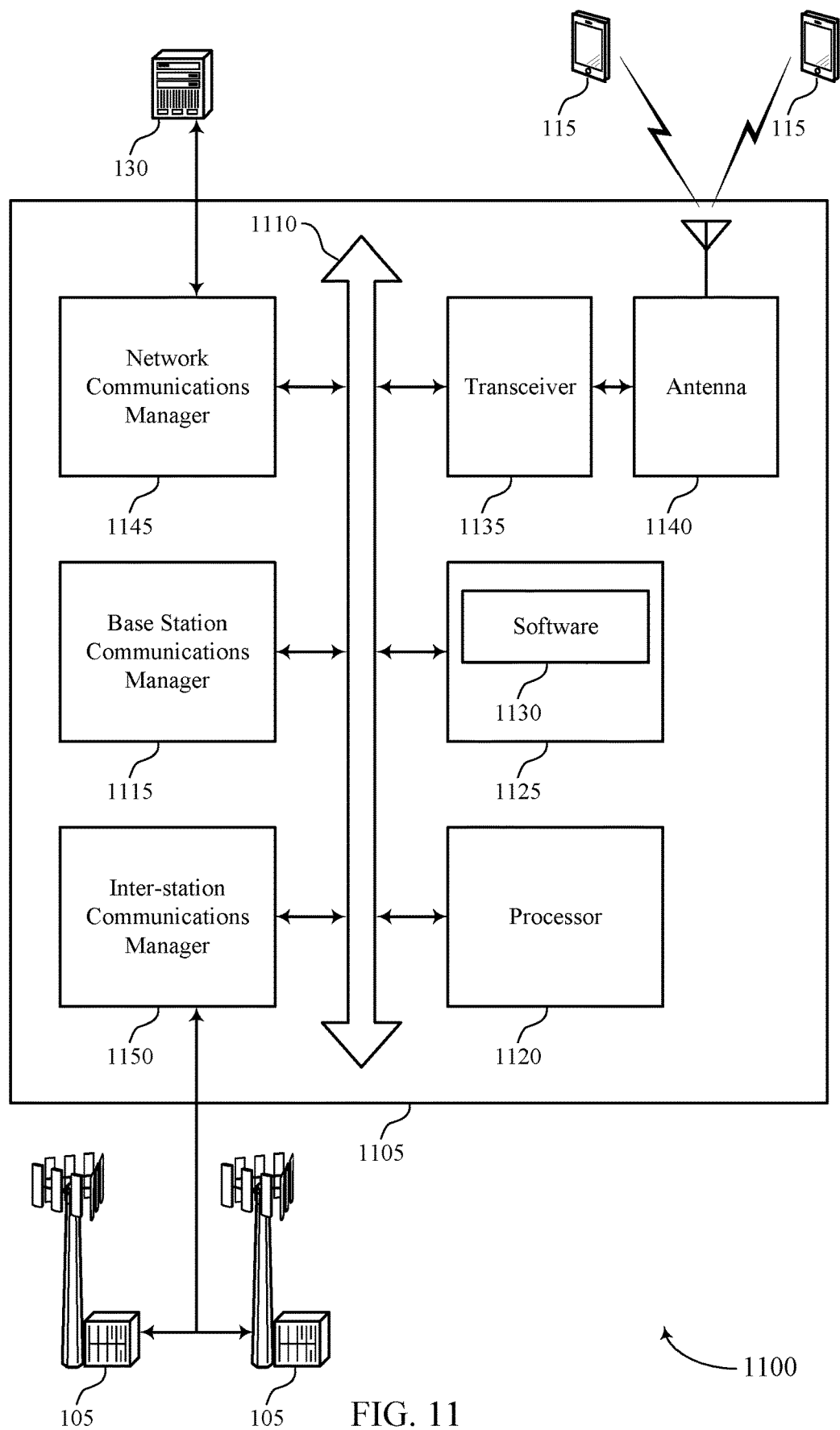
FIG. 11 illustrates a block diagram of a system including a base station that supports techniques for signaling QoS class indicators in accordance with aspects of the present disclosure.

FIG. 11 shows a diagram of a system 1100 including a device 1105 that supports techniques for signaling QoS class indicators in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for signaling QoS class indicators).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support techniques for signaling QoS class indicators. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
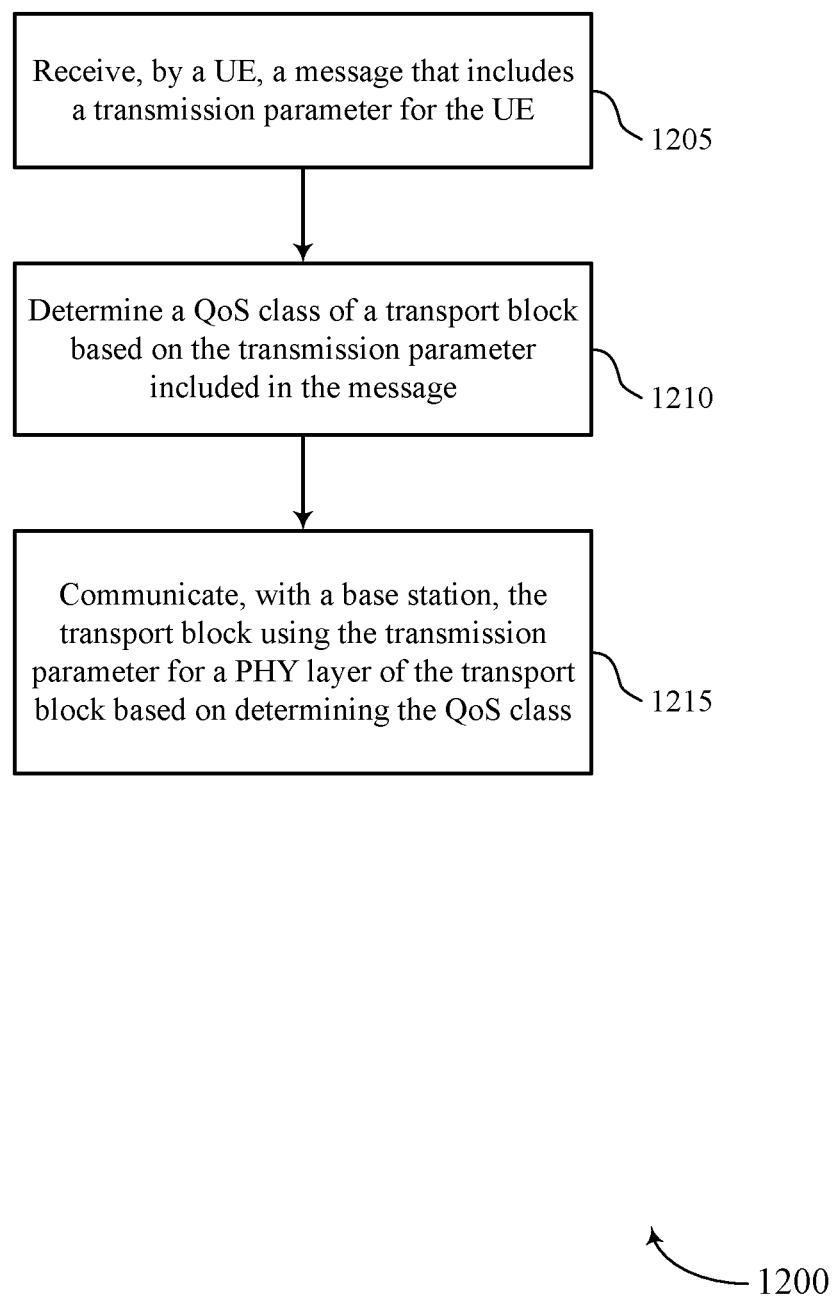
FIGS. 12 through 19 illustrate methods for techniques for signaling QoS class indicators in accordance with aspects of the present disclosure.

FIG. 12 shows a flowchart illustrating a method 1200 for techniques for signaling QoS class indicators in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may receive, by a UE, a message that includes a transmission parameter for the UE. The operations of 1205 may be performed according to the methods described herein. In certain examples, aspects of the operations of 1205 may be performed by a QCI manager as described with reference to FIGS. 4 through 7.

At 1210 the UE 115 may determine a QoS class of a transport block based on the transmission parameter included in the message. The operations of 1210 may be performed according to the methods described herein. In certain examples, aspects of the operations of 1210 may be performed by a QoS manager as described with reference to FIGS. 4 through 7.

At 1215 the UE 115 may communicate, with a base station, the transport block using the transmission parameter for a PHY layer of the transport block based on determining the QoS class. The operations of 1215 may be performed according to the methods described herein. In certain examples, aspects of the operations of 1215 may be performed by a link manager as described with reference to FIGS. 4 through 7.

Figure 13:
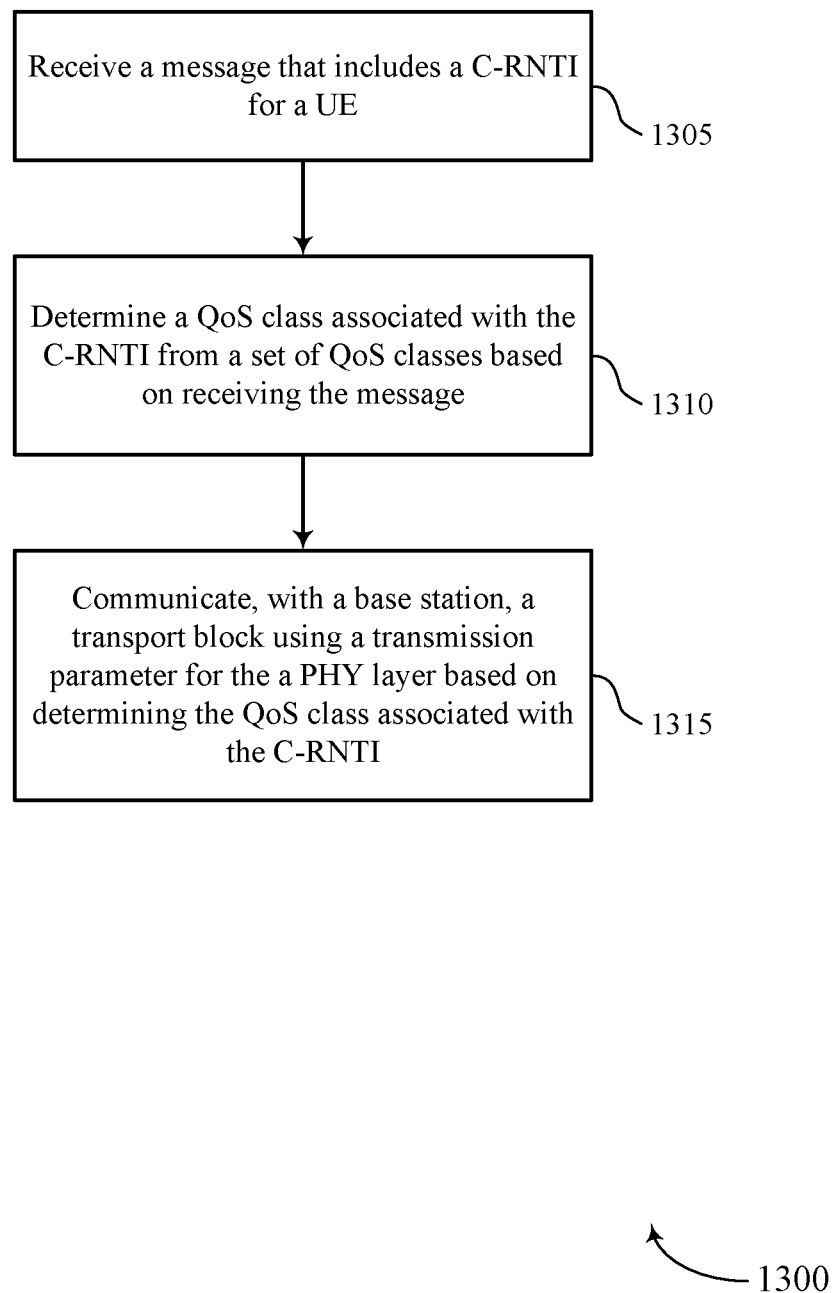

FIG. 13 shows a flowchart illustrating a method 1300 for techniques for signaling QoS class indicators in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive a message that includes a C-RNTI for a UE. The operations of 1305 may be performed according to the methods described herein. In certain examples, aspects of the operations of 1305 may be performed by a QCI manager as described with reference to FIGS. 4 through 7.

At 1310 the UE 115 may determine a QoS class associated with the C-RNTI from a plurality of QoS classes based on receiving the message. The operations of 1310 may be performed according to the methods described herein. In certain examples, aspects of the operations of 1310 may be performed by a QoS manager as described with reference to FIGS. 4 through 7.

At 1315 the UE 115 may communicate, with a base station, a transport block using a transmission parameter for a PHY layer based on determining the QoS class associated with the C-RNTI. The operations of 1315 may be performed according to the methods described herein. In certain examples, aspects of the operations of 1315 may be performed by a link manager as described with reference to FIGS. 4 through 7.

Figure 14:
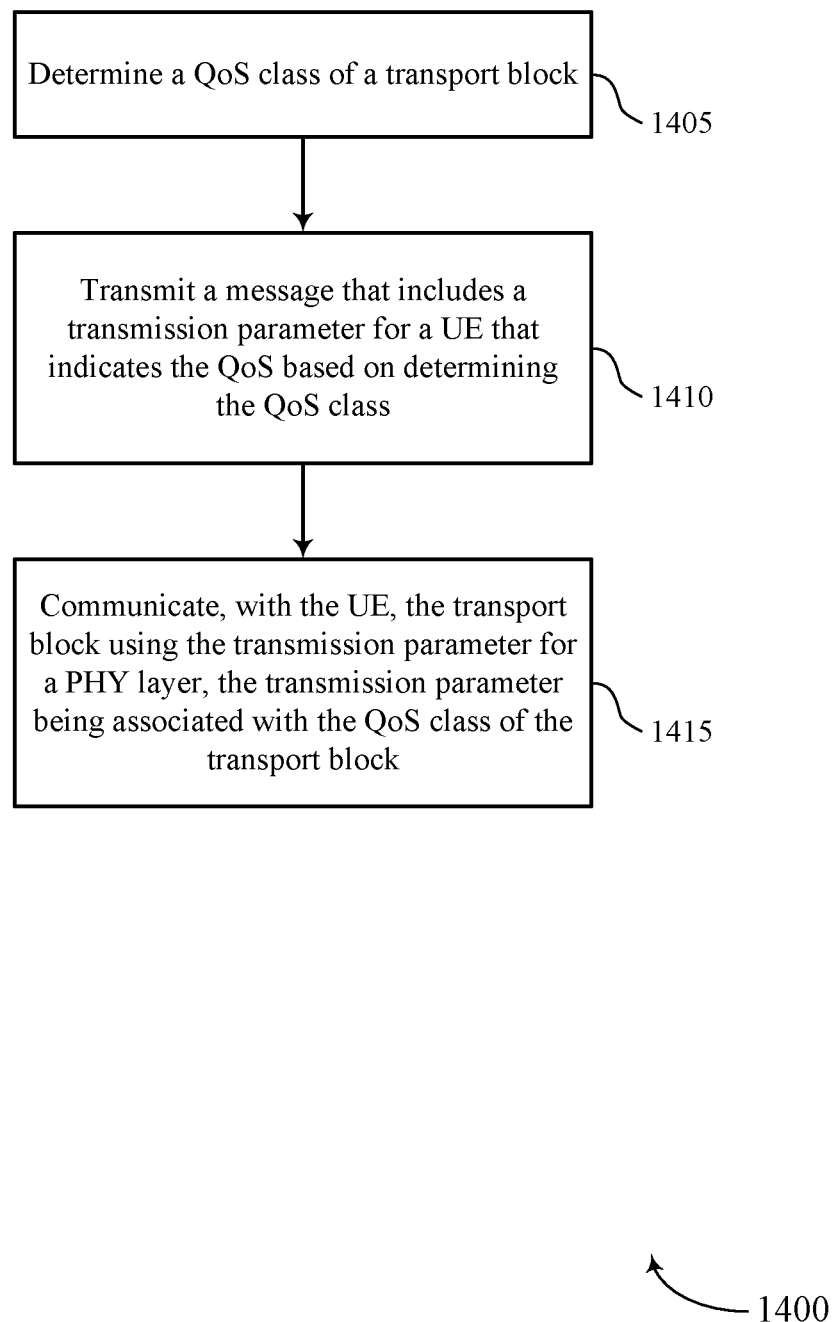

FIG. 14 shows a flowchart illustrating a method 1400 for techniques for signaling QoS class indicators in accordance with aspects of the present disclosure. The operations of method 1400 may be implemented by a base station 105 or its components as described herein. For example, the operations of method 1400 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may determine a QoS class of a transport block. The operations of 1405 may be performed according to the methods described herein. In certain examples, aspects of the operations of 1405 may be performed by a QoS manager as described with reference to FIGS. 8 through 11.

At 1410 the base station 105 may transmit a message that includes a transmission parameter for a UE that indicates the QoS based on determining the QoS class. The operations of 1410 may be performed according to the methods described herein. In certain examples, aspects of the operations of 1410 may be performed by a QCI manager as described with reference to FIGS. 8 through 11.

At 1415 the base station 105 may communicate, with the UE, the transport block using the transmission parameter for a PHY layer, the transmission parameter being associated with the QoS class of the transport block. The operations of 1415 may be performed according to the methods described herein. In certain examples, aspects of the operations of 1415 may be performed by a link manager as described with reference to FIGS. 8 through 11.

Figure 15:
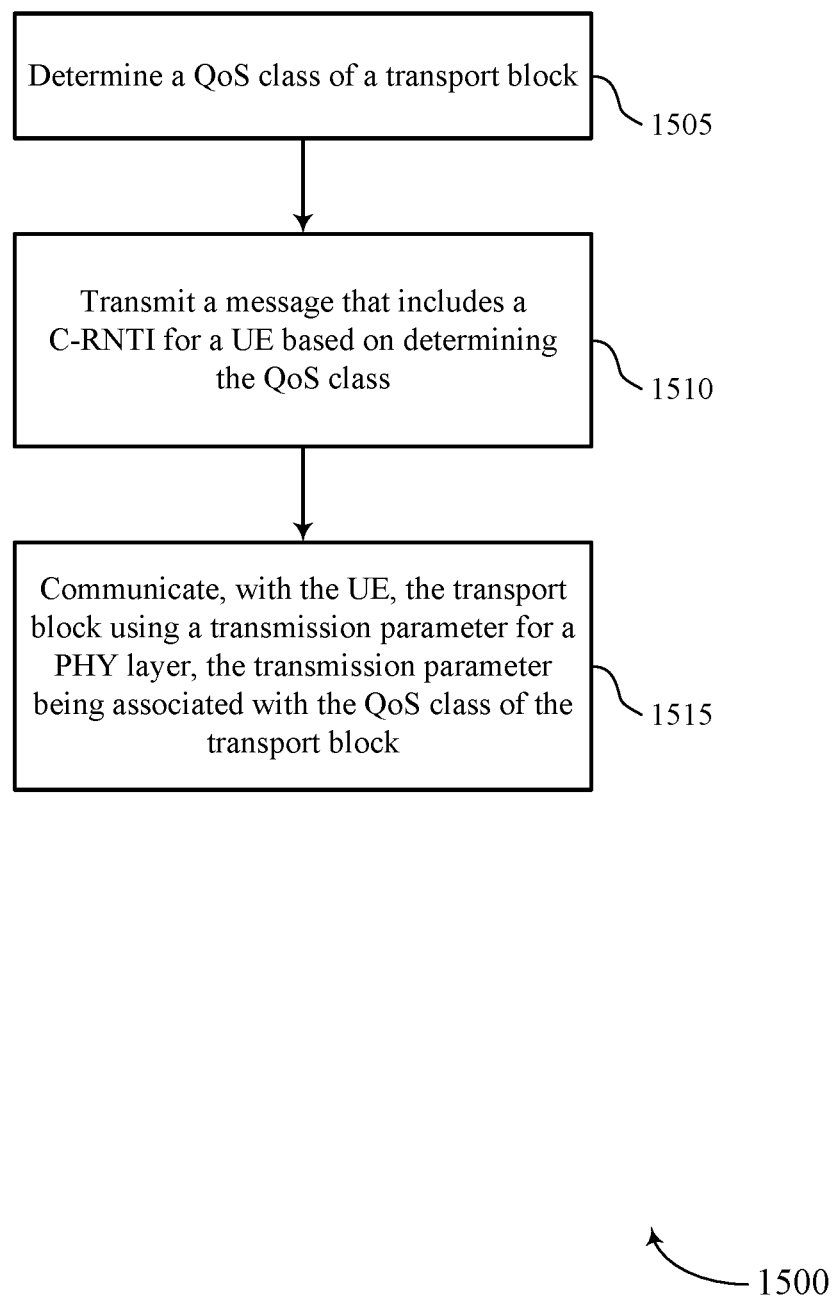

FIG. 15 shows a flowchart illustrating a method 1500 for techniques for signaling QoS class indicators in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may determine a QoS class of a transport block. The operations of 1505 may be performed according to the methods described herein. In certain examples, aspects of the operations of 1505 may be performed by a QoS manager as described with reference to FIGS. 8 through 11.

At 1510 the base station 105 may transmit a message that includes a C-RNTI for a UE based on determining the QoS class. The operations of 1510 may be performed according to the methods described herein. In certain examples, aspects of the operations of 1510 may be performed by a QCI manager as described with reference to FIGS. 8 through 11.

At 1515 the base station 105 may communicate, with the UE, the transport block using a transmission parameter for a PHY layer, the transmission parameter being associated with the QoS class of the transport block. The operations of 1515 may be performed according to the methods described herein. In certain examples, aspects of the operations of 1515 may be performed by a link manager as described with reference to FIGS. 8 through 11.

Figure 16:
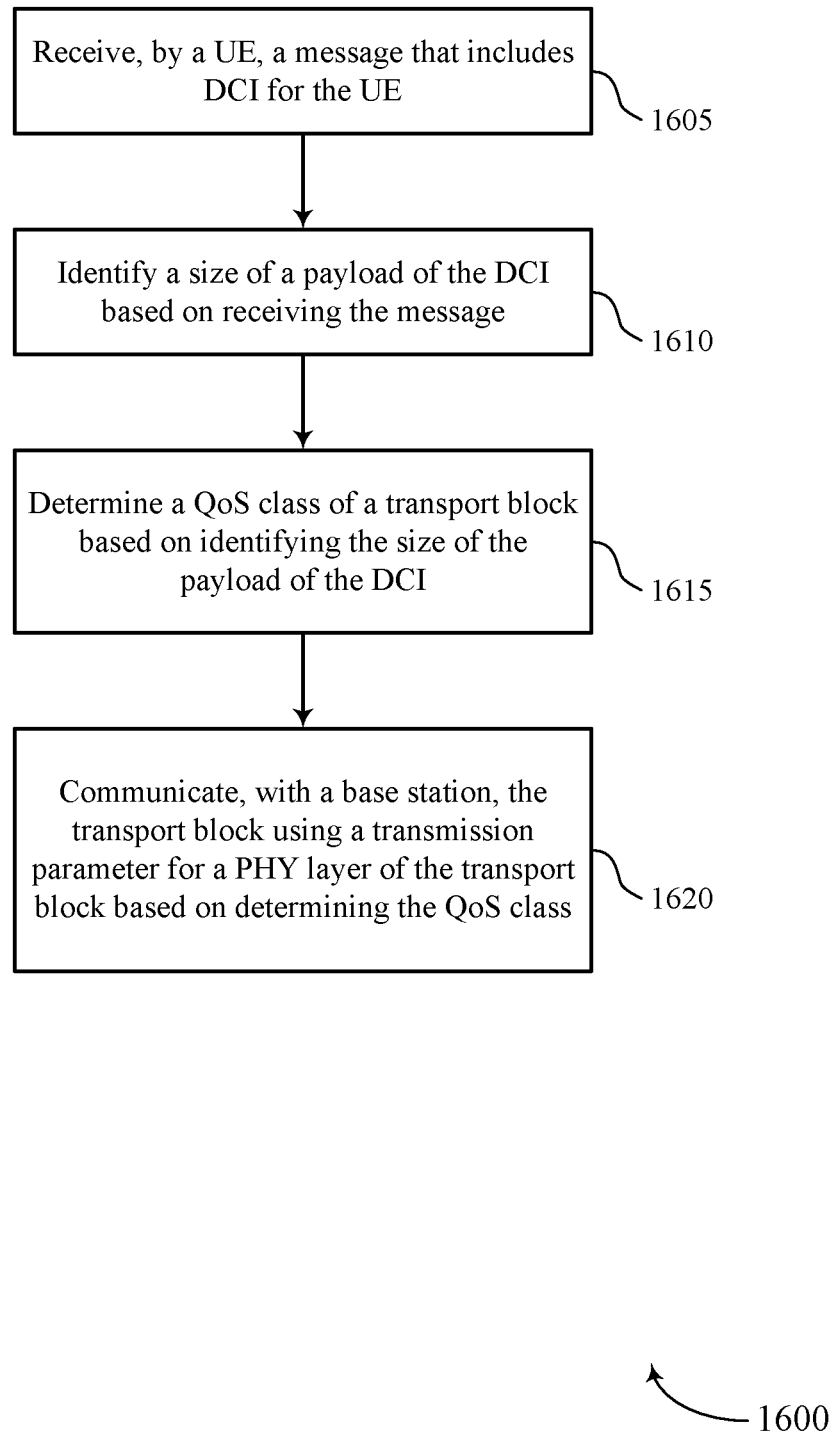

FIG. 16 shows a flowchart illustrating a method 1600 for undefined in accordance with aspects of the present disclosure. The operations of method 1600 may be implemented by a UE 115 or its components as described herein. For example, the operations of method 1600 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, by a UE, a message that includes DCI for the UE. The operations of 1605 may be performed according to the methods described herein. In certain examples, aspects of the operations of 1605 may be performed by a QCI manager as described with reference to FIGS. 4 through 7.

At 1610 the UE 115 may identify a size of a payload of the DCI based on receiving the message. The operations of 1610 may be performed according to the methods described herein. In certain examples, aspects of the operations of 1610 may be performed by a QoS manager as described with reference to FIGS. 4 through 7.

At 1615 the UE 115 may determine a QoS class of a transport block based on identifying the size of the payload of the DCI. The operations of 1615 may be performed according to the methods described herein. In certain examples, aspects of the operations of 1615 may be performed by a QoS manager as described with reference to FIGS. 4 through 7.

At 1620 the UE 115 may communicate, with a base station, the transport block using a transmission parameter for a PHY layer of the transport block based on determining the QoS class. The operations of 1620 may be performed according to the methods described herein. In certain examples, aspects of the operations of 1620 may be performed by a link manager as described with reference to FIGS. 4 through 7.

Figure 17:
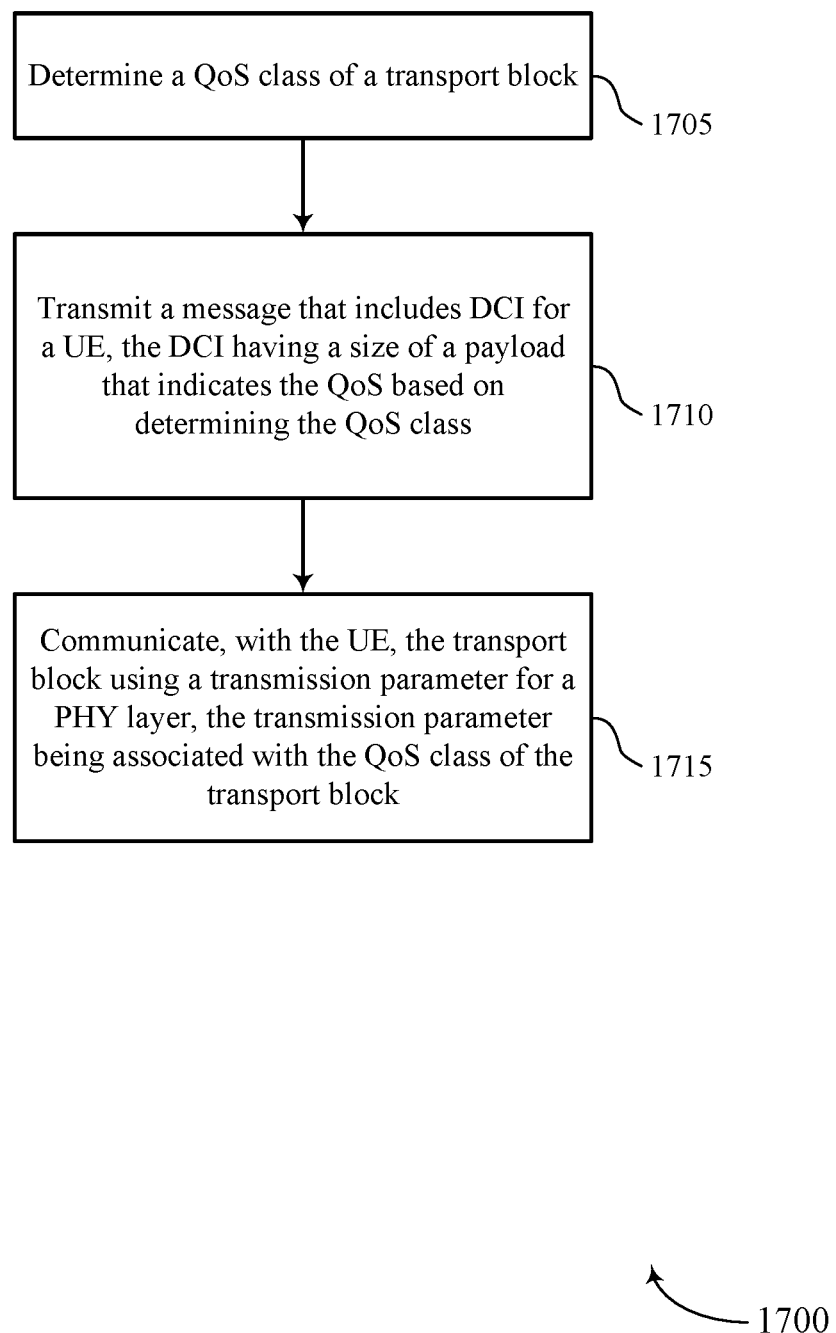

FIG. 17 shows a flowchart illustrating a method 1700 for undefined in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may determine a QoS class of a transport block. The operations of 1705 may be performed according to the methods described herein. In certain examples, aspects of the operations of 1705 may be performed by a QoS manager as described with reference to FIGS. 8 through 11.

At 1710 the base station 105 may transmit a message that includes DCI for a UE, the DCI having a size of a payload that indicates the QoS based on determining the QoS class. The operations of 1710 may be performed according to the methods described herein. In certain examples, aspects of the operations of 1710 may be performed by a QCI manager as described with reference to FIGS. 8 through 11.

At 1715 the base station 105 may communicate, with the UE, the transport block using a transmission parameter for a PHY layer, the transmission parameter being associated with the QoS class of the transport block. The operations of 1715 may be performed according to the methods described herein. In certain examples, aspects of the operations of 1715 may be performed by a link manager as described with reference to FIGS. 8 through 11.

Figure 18:
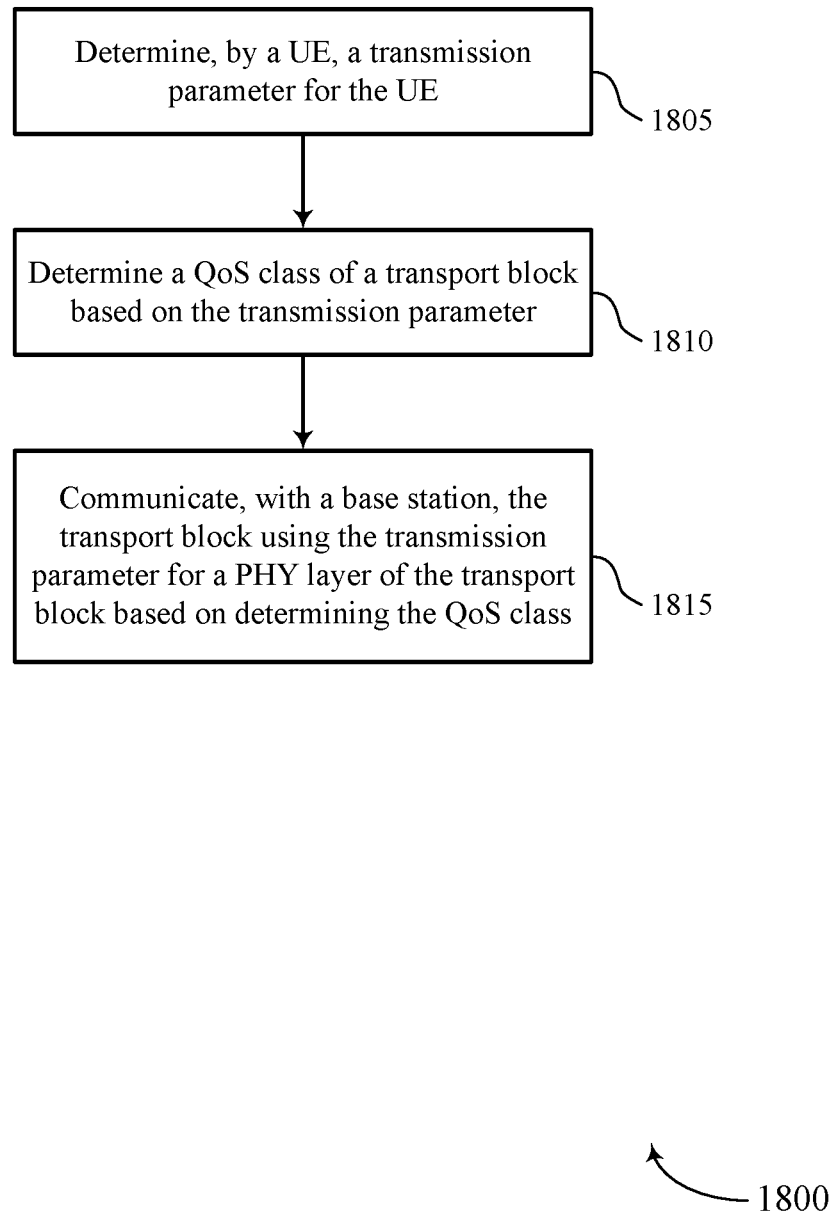

FIG. 18 shows a flowchart illustrating a method 1800 that supports techniques for signaling QoS class indicators in accordance with aspects of the present disclosure. The operations of method 1800 may be implemented by a UE 115 or its components as described herein. For example, the operations of method 1800 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1805, the UE may determine, by a UE, a transmission parameter for the UE. The operations of 1805 may be performed according to the methods described herein. In some examples, aspects of the operations of 1805 may be performed by a QCI manager as described with reference to FIGS. 4 through 7.

At 1810, the UE may determine a QoS class of a transport block based on the transmission parameter. The operations of 1810 may be performed according to the methods described herein. In some examples, aspects of the operations of 1810 may be performed by a QoS manager as described with reference to FIGS. 4 through 7.

At 1815, the UE may communicate, with a base station, the transport block using the transmission parameter for a PHY layer of the transport block based on determining the QoS class. The operations of 1815 may be performed according to the methods described herein. In some examples, aspects of the operations of 1815 may be performed by a link manager as described with reference to FIGS. 4 through 7.

Figure 19:
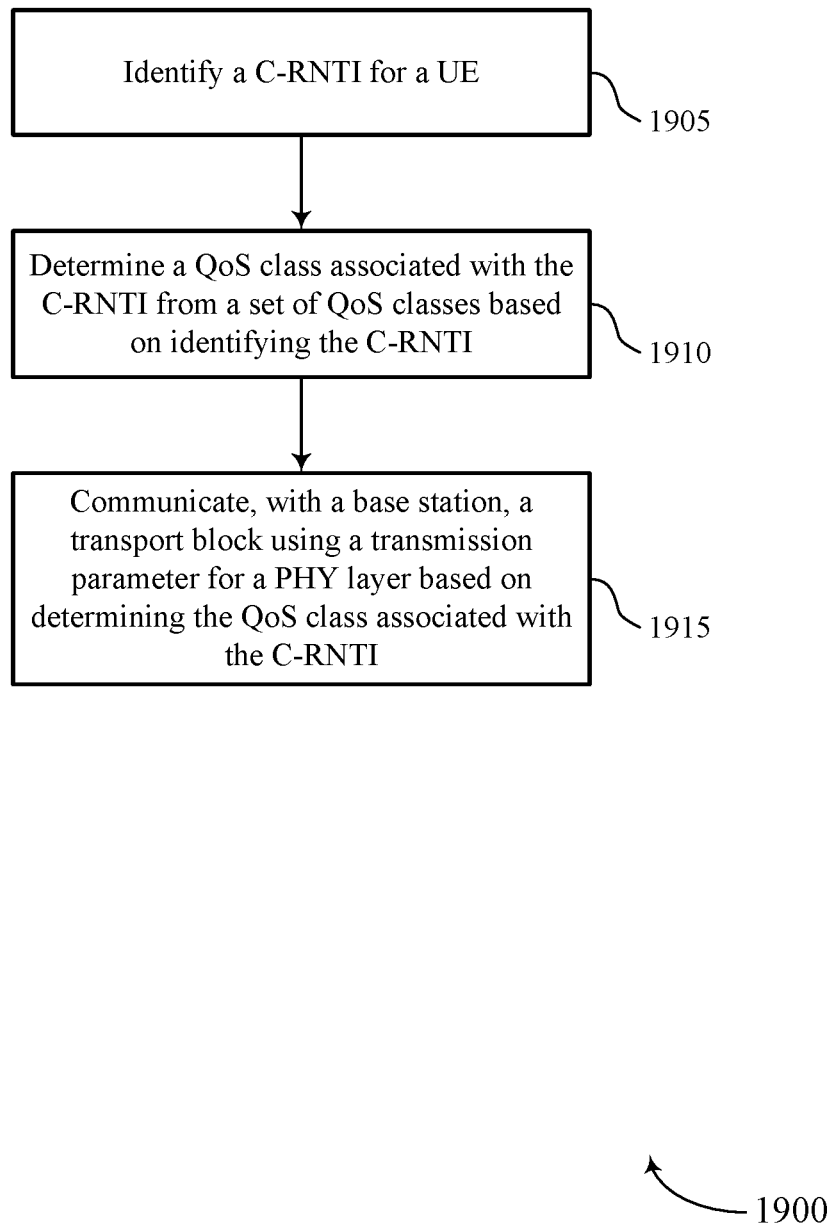

FIG. 19 shows a flowchart illustrating a method 1900 that supports techniques for signaling QoS class indicators in accordance with aspects of the present disclosure. The operations of method 1900 may be implemented by a UE 115 or its components as described herein. For example, the operations of method 1900 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1905, the UE may identify a C-RNTI for a UE. The operations of 1905 may be performed according to the methods described herein. In some examples, aspects of the operations of 1905 may be performed by a QCI manager as described with reference to FIGS. 4 through 7.

At 1910, the UE may determine a QoS class associated with the C-RNTI from a set of QoS classes based on identifying the C-RNTI. The operations of 1910 may be performed according to the methods described herein. In some examples, aspects of the operations of 1910 may be performed by a QoS manager as described with reference to FIGS. 4 through 7.

At 1915, the UE may communicate, with a base station, a transport block using a transmission parameter for a PHY layer based on determining the QoS class associated with the C-RNTI. The operations of 1915 may be performed according to the methods described herein. In some examples, aspects of the operations of 1915 may be performed by a link manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a user equipment (UE), a message that includes a transmission parameter for the UE;
   determining a quality of service class of a transport block based at least in part on the transmission parameter included in the message;
   communicating, with a base station, the transport block using the transmission parameter for a physical layer of the transport block based at least in part on determining the quality of service class;
   receiving a second message that includes a second transmission parameter associated with a second quality of service class different from the quality of service class;
   determining that both the message and the second message allocate resources for a single communication resource; and
   selecting the quality of service class or the second quality of service class to communicate with during the single communication resource based at least in part on a conflict resolution procedure.

2. The method of claim 1, further comprising:
determining the transmission parameter for the physical layer of the transport block based at least in part on determining the quality of service class, wherein communicating the transport block is based at least in part on determining the transmission parameter.

3. The method of claim 1, further comprising:
identifying, in the message, an indicator of the quality of service class associated with the transmission parameter, wherein determining the quality of service class is based at least in part on identifying the indicator.

4. The method of claim 3, wherein identifying the indicator comprises:
identifying a single bit that indicates an enhanced mobile broadband quality of service class or an ultra-reliable low-latency communications quality of service class.

5. The method of claim 3, wherein identifying the indicator comprises:
identifying the indicator in a field of downlink control information in the message.

6. The method of claim 1, further comprising:
configuring the UE to use a plurality of quality of service classes, at least one of which includes the determined quality of service class, wherein receiving the message is based at least in part on configuring the UE to use the plurality of quality of service classes.

7. The method of claim 1, wherein the transmission parameter is configured as a quality of service class identifier for physical layer signaling.

8. The method of claim 1, wherein the transmission parameter is a modulation and coding scheme value, a channel quality indicator value, a modulation and coding scheme table, a channel quality indicator table, a type of resource allocation on either downlink or uplink, a granularity of resource allocation on either downlink or uplink, a power loop control, power boost, control monitoring, a time-domain configuration for control monitoring, a search space for control monitoring, a format of downlink control information for control monitoring, a size of downlink control information for control monitoring, a configuration of control and data repetition for control monitoring, an aggregation level for control monitoring, a timing for channel state information reporting by the UE, a timing adjustment for channel state information reporting by the UE, a command for channel state information reporting by the UE, a loop for channel state information reporting by the UE, a granularity for channel state information reporting by the UE, a triggering event for channel state information reporting by the UE, a measuring parameter for channel state information reporting by the UE, a triggering event of a sounding reference signal, a measuring parameter of the sounding reference signal, a reporting of the sounding reference signal by the UE, a starting time and a duration for a control channel, a starting time and a duration for a data channel, a configuration for reference signals, a processing timeline of downlink data and/or uplink data preparation and transmission, a processing timeline of a hybrid automatic repeat request acknowledgement, or a combination thereof.

9. The method of claim 1, wherein the quality of service class is an enhanced mobile broadband quality of service class or an ultra-reliable low-latency communications quality of service class.

10. The method of claim 1, wherein the message is an uplink control/resource allocation message or a downlink control/resource allocation message communicated using a physical downlink control channel.

11. A method for wireless communication, comprising:
receiving a message that includes a cell radio network temporary identifier for a user equipment (UE);
determining a quality of service class associated with the cell radio network temporary identifier from a plurality of quality of service classes based at least in part on receiving the message;
communicating, with a base station, a transport block using a transmission parameter for a physical layer based at least in part on determining the quality of service class associated with the cell radio network temporary identifier;
receiving a second message that includes a second cell radio network temporary identifier associated with a second quality of service class different from the quality of service class;
determining that both the message and the second message allocate resources for a single communication resource; and
selecting the quality of service class or the second quality of service class to communicate with during the single communication resource based at least in part on a conflict resolution procedure.

12. The method of claim 11, further comprising:
determining the transmission parameter for the physical layer of the transport block based at least in part on determining the quality of service class associated with the cell radio network temporary identifier, wherein communicating the transport block is based at least in part on determining the transmission parameter.

13. The method of claim 11, further comprising:
configuring the UE with a plurality of cell radio network temporary identifiers, at least one of which includes the cell radio network temporary identifier, wherein each cell radio network temporary identifier of the plurality of cell radio network temporary identifiers is associated with a different quality of service class.

14. The method of claim 11, wherein the cell radio network temporary identifier indicates an enhanced mobile broadband quality of service class or an ultra-reliable low-latency communications quality of service class.

15. The method of claim 11, further comprising:
configuring the UE to use the plurality of quality of service classes, the determined quality of service class being one of the plurality of configured quality of service classes, wherein receiving the message is based at least in part on configuring the UE to use the plurality of quality of service classes.

16. The method of claim 11, wherein the cell radio network temporary identifier is configured as a quality of service class identifier for physical layer signaling.

17. The method of claim 11, wherein the transmission parameter is a modulation and coding scheme table, a channel quality indicator table, a type of resource allocation on either downlink or uplink, a granularity of resource allocation on either downlink or uplink, a power loop control, power boost, control monitoring, a time-domain configuration for control monitoring, a search space for control monitoring, a format of downlink control information for control monitoring, a size of downlink control information for control monitoring, a configuration of control and data repetition for control monitoring, an aggregation level for control monitoring, a timing for channel state information reporting by the UE, a timing adjustment for channel state information reporting by the UE, a command for channel state information reporting by the UE, a loop for channel state information reporting by the UE, a granularity for channel state information reporting by the UE, a triggering event for channel state information reporting by the UE, a measuring parameter for channel state information reporting by the UE, a triggering event of a sounding reference signal, a measuring parameter of the sounding reference signal, a reporting of the sounding reference signal by the UE, a starting time and a duration for a control channel, a starting time and a duration for a data channel, a configuration for reference signals, a processing timeline of downlink data and/or uplink data preparation and transmission, a processing timeline of a hybrid automatic repeat request acknowledgement, or a combination thereof.

18. The method of claim 11, wherein the message is an uplink control/resource allocation message or a downlink control/resource allocation message communicated using a physical downlink control channel.

19. An apparatus for wireless communication, comprising:
   a processor;
   memory coupled with the processor; and
   instructions stored in the memory and executable by the processor to cause the apparatus to
   receive, by a user equipment (UE), a message that includes a transmission parameter for the UE;
   determine a quality of service class of a transport block based at least in part on the transmission parameter included in the message;
   communicate, with a base station, the transport block using the transmission parameter for a physical layer of the transport block based at least in part on determining the quality of service class;
   receive a second message that includes a second transmission parameter associated with a second quality of service class different from the quality of service class;
   determine that both the message and the second message allocate resources for a single communication resource; and
   select the quality of service class or the second quality of service class to communicate with during the single communication resource based at least in part on a conflict resolution procedure.

20. The apparatus of claim 19, wherein the instructions are further executable by the processer to cause the apparatus to:
   determine the transmission parameter for the physical layer of the transport block based at least in part on determining the quality of service class, wherein communicating the transport block is based at least in part on determining the transmission parameter.

21. The apparatus of claim 19, wherein the instructions are further executable by the processer to cause the apparatus to:
   identify, in the message, an indicator of the quality of service class associated with the transmission parameter, wherein determining the quality of service class is based at least in part on identifying the indicator.

22. An apparatus for wireless communication, comprising:
   a processor;
   memory coupled with the processor; and
   instructions stored in the memory and executable by the processor to cause the apparatus to:
   receive a message that includes a cell radio network temporary identifier for a user equipment (UE);
   determine a quality of service class associated with the cell radio network temporary identifier from a plurality of quality of service classes based at least in part on receiving the message;
   communicate, with a base station, a transport block using a transmission parameter for a physical layer based at least in part on determining the quality of service class associated with the cell radio network temporary identifier;
   receive a second message that includes a second cell radio network temporary identifier associated with a second quality of service class different from the quality of service class;
   determine that both the message and the second message allocate resources for a single communication resource; and
   select the quality of service class or the second quality of service class to communicate with during the single communication resource based at least in part on a conflict resolution procedure.

23. The apparatus of claim 22, wherein the instructions are further executable by the processor to cause the apparatus to:
   determine the transmission parameter for the physical layer of the transport block based at least in part on determining the quality of service class associated with the cell radio network temporary identifier, wherein communicating the transport block is based at least in part on determining the transmission parameter.

24. The apparatus of claim 22, wherein the instructions are further executable by the processor to cause the apparatus to:
   configure the UE with a plurality of cell radio network temporary identifiers, at least one of which includes the cell radio network temporary identifier, wherein each cell radio network temporary identifier of the plurality of cell radio network temporary identifiers is associated with a different quality of service class.

25. The apparatus of claim 22, wherein the cell radio network temporary identifier indicates an enhanced mobile broadband quality of service class or an ultra-reliable low-latency communications quality of service class.

26. The apparatus of claim 22, wherein the instructions are further executable by the processor to cause the apparatus to:
   configure the UE to use the plurality of quality of service classes, the determined quality of service class being one of the plurality of configured quality of service classes, wherein receiving the message is based at least in part on configuring the UE to use the plurality of quality of service classes.

* * * * *